United States Patent
Bongiorno

(10) Patent No.: US 9,885,444 B1
(45) Date of Patent: Feb. 6, 2018

(54) SLACKS VALET MECHANISM FOR A LAVATORY

(71) Applicant: James Bongiorno, Huntington, NY (US)

(72) Inventor: James Bongiorno, Huntington, NY (US)

( * ) Notice: Subject to any disclaimer, the term of this patent is extended or adjusted under 35 U.S.C. 154(b) by 0 days.

(21) Appl. No.: 13/794,454

(22) Filed: Mar. 11, 2013

Related U.S. Application Data

(60) Provisional application No. 61/685,119, filed on Mar. 12, 2012, provisional application No. 61/688,320, filed on May 10, 2012.

(51) Int. Cl.
| | |
|---|---|
| *F16M 13/02* | (2006.01) |
| *A47K 17/00* | (2006.01) |
| *A47K 13/00* | (2006.01) |
| *A47D 5/00* | (2006.01) |
| *F16M 13/00* | (2006.01) |
| *A47K 17/02* | (2006.01) |

(52) U.S. Cl.
CPC ............. *F16M 13/00* (2013.01); *A47K 17/02* (2013.01); *A47D 5/00* (2013.01); *A47K 13/00* (2013.01); *F16M 13/02* (2013.01); *F16M 2200/061* (2013.01)

(58) Field of Classification Search
CPC .. F16M 13/00; F16M 13/02; F16M 2200/061; A47K 17/02; A47K 13/00; A47K 13/10; A47D 5/00
USPC .......... 248/214, 240.4, 240.2, 205.1; 108/48, 108/134, 116, 124, 128; 4/578.1, 611, 4/605
See application file for complete search history.

(56) References Cited

U.S. PATENT DOCUMENTS

| | | | |
|---|---|---|---|
| 76,756 | A | 4/1868 | Hancock |
| 110,607 | A | 12/1870 | Tredenick |
| 121,953 | A | 12/1871 | Miller |
| 181,442 | A | 8/1876 | Howell |
| 194,135 | A | 8/1877 | De Bonald |
| 257,631 | A | 5/1882 | Abbey |
| 269,171 | A | 12/1882 | Brickley |

(Continued)

FOREIGN PATENT DOCUMENTS

| | | |
|---|---|---|
| CN | 201337292 Y | 12/2007 |
| CN | 202950483 | 5/2013 |

(Continued)

*Primary Examiner* — Tan Le

(57) ABSTRACT

A slacks valet mechanism, to prevent the slacks of a user of a lavatory stall toilet from becoming soiled by preventing its contact with the floor, includes an arm coupled to the stall door/wall, being movable between stowed and deployed positions. The stowed arm is proximate to the lavatory door, and the deployed arm has a portion proximate to the toilet, to thereon receive the lowered slacks to prevent soiling. A simple stop means substantially limits travel into the deployed position. Another embodiment uses tension spring(s) for the stop, thereby permitting break-away arm pivoting beyond normal deployment, if it is inadvertently stepped upon, to prevent damage thereto. A dual-pivotable coupling with the stall door facilitates arm rotation, in case it is kicked, to further prevent damage. A two-section arm provides for more ergonomic support for the user's slacks, when seated. Peelable layers on the arm provide further sanitary protection.

21 Claims, 28 Drawing Sheets

(56) References Cited

U.S. PATENT DOCUMENTS

| | | |
|---|---|---|
| 287,655 A | 10/1883 | French |
| 326,742 A | 9/1885 | Iske |
| 342,954 A | 6/1886 | Ertell |
| 363,081 A | 5/1887 | Pickett |
| 394,252 A | 12/1888 | Davis |
| 426,313 A | 4/1890 | Paxson |
| 445,633 A | 2/1891 | Becker |
| 457,190 A | 8/1891 | Evans |
| 471,858 A | 3/1892 | Hamlin |
| 472,188 A | 4/1892 | Burdge |
| 528,498 A | 10/1894 | Anderson |
| 544,713 A | 8/1895 | Wynkoop |
| 579,842 A | 3/1897 | Rupert |
| 586,977 A | 7/1897 | Sibley |
| 596,380 A | 12/1897 | Pursley |
| 611,929 A | 10/1898 | Norris |
| 620,638 A | 3/1899 | Boucher |
| 622,112 A | 3/1899 | Brock |
| 660,316 A | 10/1900 | Shoenberg |
| 672,390 A | 4/1901 | Sudheimer |
| 674,586 A | 5/1901 | Riley |
| 724,427 A | 4/1903 | Bonsall |
| 748,719 A | 1/1904 | Germain |
| 761,893 A | 6/1904 | Lee |
| 852,894 A | 5/1907 | McCoy |
| 853,527 A | 5/1907 | Tye |
| 882,277 A | 3/1908 | Teipel |
| 895,905 A | 8/1908 | Soraghan |
| 902,635 A | 11/1908 | Wowra |
| 909,114 A | 1/1909 | Pitts |
| 914,697 A | 3/1909 | Bryant |
| 927,172 A | 7/1909 | Sauber |
| 938,832 A | 11/1909 | Dozier |
| 954,364 A | 4/1910 | Vail |
| 954,920 A | 4/1910 | Blandford |
| 971,493 A | 9/1910 | Crane |
| 975,273 A | 11/1910 | Noppe |
| 977,921 A | 12/1910 | Zizinia |
| 978,423 A | 12/1910 | Zizinia |
| 984,556 A | 2/1911 | Gehrke |
| 999,283 A | 8/1911 | White |
| 1,097,755 A | 5/1914 | Goldsmith |
| 1,126,717 A | 2/1915 | Danielson |
| 1,208,986 A | 12/1916 | Krodel |
| 1,219,476 A | 3/1917 | Nelson |
| 1,264,864 A | 4/1918 | Roth |
| 1,268,371 A | 6/1918 | McDonald |
| 1,277,442 A | 9/1918 | McCann |
| 1,278,072 A | 9/1918 | Ossry |
| 1,293,953 A | 2/1919 | Shoemaker |
| 1,301,607 A | 4/1919 | Rothery |
| 1,318,257 A | 10/1919 | Blaustein |
| 1,352,556 A | 9/1920 | Soule |
| 1,353,287 A | 9/1920 | Stein |
| 1,361,739 A | 12/1920 | Matheson |
| 1,362,730 A | 12/1920 | Mull |
| 1,369,267 A | 2/1921 | Riordan |
| 1,373,460 A | 4/1921 | Striker |
| 1,377,444 A | 5/1921 | Shoemaker |
| 1,435,183 A | 11/1922 | Shepard |
| 1,473,702 A | 11/1923 | Guthridge |
| 1,497,209 A | 6/1924 | Chapman |
| 1,510,056 A | 9/1924 | Hamson |
| 1,522,873 A | 1/1925 | Doering |
| 1,545,122 A | 7/1925 | Brown |
| 1,557,251 A | 10/1925 | Hamlin |
| 1,582,762 A | 4/1926 | Klock |
| 1,587,676 A | 6/1926 | Patterson |
| 1,637,145 A | 7/1927 | Hart |
| 1,659,532 A | 2/1928 | Long |
| 1,694,920 A | 12/1928 | Kapnek |
| 1,705,203 A | 3/1929 | Patterson |
| 1,713,704 A | 5/1929 | Lobel |
| 1,716,923 A | 6/1929 | Lindquist |
| 1,724,218 A | 8/1929 | Nixon |
| 1,732,162 A | 10/1929 | Griner |
| 1,751,198 A | 3/1930 | Franck |
| 1,796,344 A | 3/1931 | Pleiss |
| 1,818,761 A | 8/1931 | Sendler |
| 1,821,722 A | 9/1931 | Neal |
| 1,833,022 A | 11/1931 | Judelson |
| 1,836,008 A | 12/1931 | Anzalone |
| 1,883,219 A | 10/1932 | Wolf |
| 1,892,687 A | 1/1933 | Teufel |
| 1,912,950 A | 6/1933 | Moungelis |
| 1,933,981 A | 11/1933 | Householder |
| 1,936,813 A | 11/1933 | West |
| 1,992,356 A | 2/1935 | Dary |
| 1,995,980 A | 3/1935 | Haymond |
| 2,039,758 A | 5/1936 | Wayne |
| 2,054,371 A | 9/1936 | Ritz |
| 2,067,833 A | 1/1937 | Edison |
| 2,070,408 A | 2/1937 | Leidgen |
| 2,109,032 A | 2/1938 | Pleiss |
| 2,118,342 A | 5/1938 | Dillon |
| 2,127,333 A | 8/1938 | Hall |
| 2,128,596 A | 8/1938 | Redin |
| 2,134,389 A | 11/1938 | Gessler |
| 2,142,830 A | 1/1939 | Wendell |
| 2,149,908 A | 3/1939 | Poole |
| 2,194,191 A | 3/1940 | Wolf |
| 2,210,184 A | 8/1940 | Sitter |
| 2,212,176 A | 8/1940 | Home |
| 2,213,537 A | 9/1940 | Stevens |
| 2,224,247 A | 12/1940 | Bentz |
| 2,240,482 A | 5/1941 | Anderson |
| 2,242,150 A | 5/1941 | Sievers |
| 2,263,016 A | 11/1941 | Sohn |
| 2,270,802 A | 1/1942 | Kristensen |
| 2,268,894 A | 6/1942 | Ogren |
| 2,287,079 A | 6/1942 | Anderson |
| 2,299,962 A | 10/1942 | Byrkit |
| 2,321,196 A | 6/1943 | Graber |
| 2,345,745 A | 4/1944 | Goldbert |
| 2,382,310 A | 8/1945 | Harding |
| 2,388,366 A | 11/1945 | Peterson |
| 2,409,956 A | 11/1946 | Ramstack |
| 2,429,037 A | 10/1947 | Tamay |
| 2,429,041 A | 10/1947 | Anderson |
| 2,431,196 A | 11/1947 | Pascoo |
| 2,431,976 A | 12/1947 | Ajax |
| 2,433,247 A | 12/1947 | Stowell |
| 2,433,275 A | 12/1947 | Higby |
| 2,434,891 A | 1/1948 | Swanson |
| 2,453,919 A | 11/1948 | Johnson |
| 2,460,505 A | 2/1949 | Jahoda |
| 2,461,457 A | 2/1949 | Weber |
| 2,465,859 A | 3/1949 | Fidler |
| 2,469,208 A | 5/1949 | Rothrock |
| 2,471,349 A | 5/1949 | Reiss |
| 2,483,242 A | 9/1949 | Smith |
| 2,484,535 A | 10/1949 | Stader |
| 2,494,318 A | 1/1950 | Sturk |
| 2,508,527 A | 5/1950 | Martin |
| 2,508,871 A | 5/1950 | Stein |
| 2,514,790 A | 7/1950 | Ostrow |
| 2,518,370 A | 8/1950 | Pincus |
| 2,539,803 A | 1/1951 | Westberg |
| 2,561,728 A | 7/1951 | Dolan |
| 2,582,320 A | 1/1952 | Evans |
| 2,589,564 A | 3/1952 | Moore |
| 2,589,611 A | 3/1952 | Hay |
| 2,595,521 A | 5/1952 | Hanson |
| 2,598,502 A | 5/1952 | Butler |
| 2,626,714 A | 1/1953 | Rover |
| 2,633,998 A | 4/1953 | Derman |
| 2,635,369 A | 4/1953 | Baker |
| 2,639,816 A | 5/1953 | Fogg |
| 2,643,000 A | 6/1953 | Morrison |
| 2,645,355 A | 7/1953 | Evans |
| 2,647,643 A | 8/1953 | Cruikshank |
| 2,659,491 A | 11/1953 | Williams |
| 2,662,645 A | 12/1953 | Piton |
| 2,663,530 A | 12/1953 | Nye |

(56) References Cited

U.S. PATENT DOCUMENTS

| | | |
|---|---|---|
| 2,672,241 A | 3/1954 | Cohen |
| 2,675,923 A | 4/1954 | Humphrey |
| 2,684,225 A | 7/1954 | Johnson |
| 2,690,073 A | 9/1954 | McLaughlin |
| 2,692,688 A | 10/1954 | Callais |
| 2,706,049 A | 4/1955 | Andrews |
| 2,734,639 A | 2/1956 | Green |
| 2,736,437 A | 2/1956 | Boycott |
| 2,743,023 A | 4/1956 | Larson |
| 2,769,552 A | 11/1956 | Seidman |
| 2,776,029 A | 1/1957 | Hult |
| 2,778,705 A | 1/1957 | Barker |
| 2,786,579 A | 3/1957 | Wright |
| 2,840,241 A | 6/1958 | Callais |
| 2,865,476 A | 12/1958 | Schooler |
| 2,866,559 A | 12/1958 | Byrne |
| 2,868,388 A | 1/1959 | Crites |
| 2,880,532 A | 4/1959 | Strong |
| 2,885,086 A | 5/1959 | Lawrence |
| 2,895,698 A | 7/1959 | Palmer |
| 2,902,173 A | 9/1959 | Staffeld |
| 2,915,197 A | 12/1959 | Prenveille |
| 2,925,916 A | 2/1960 | Pollock |
| 2,972,419 A | 2/1960 | Zeien |
| 2,926,824 A | 3/1960 | Clair |
| 2,931,547 A | 5/1960 | Dick |
| 2,941,672 A | 6/1960 | Lathrop |
| 2,948,406 A | 8/1960 | Steele |
| 2,952,367 A | 9/1960 | Creveling |
| 2,954,954 A | 10/1960 | Larson |
| 2,959,297 A | 11/1960 | Larson |
| 2,981,418 A | 4/1961 | Bradley |
| 2,987,193 A | 6/1961 | Pajor |
| 3,002,666 A | 10/1961 | Silverman |
| 3,019,909 A | 2/1962 | Churchill |
| 3,023,911 A | 3/1962 | Wells |
| 3,032,273 A | 5/1962 | Spielman |
| 3,044,630 A | 7/1962 | Szabo |
| 3,055,509 A | 9/1962 | Robbins |
| 3,061,155 A | 10/1962 | Dusen |
| 3,079,004 A | 2/1963 | Scott |
| 3,084,894 A | 4/1963 | Koenen |
| 3,146,890 A | 9/1964 | Cowper |
| 3,149,879 A | 9/1964 | Steiber |
| 3,163,295 A | 12/1964 | Standard |
| 3,175,696 A | 3/1965 | Milbourne |
| 3,178,033 A | 4/1965 | Wirsing |
| 3,194,362 A | 7/1965 | Wargo |
| 3,200,435 A | 8/1965 | Hemmeter |
| 3,211,295 A | 10/1965 | Weiss |
| 3,214,071 A | 10/1965 | Brodesser |
| 3,217,670 A | 11/1965 | Struensee |
| 3,237,778 A | 3/1966 | Hoodis |
| 3,249,233 A | 5/1966 | Marcus |
| 3,283,453 A | 11/1966 | Schooler |
| 3,284,974 A | 11/1966 | Stein |
| 3,310,180 A | 3/1967 | Neagle |
| 3,333,711 A | 8/1967 | Helmer |
| 3,361,267 A | 1/1968 | Burkholder |
| 3,374,899 A | 3/1968 | Bator |
| 3,417,874 A | 12/1968 | Bryant |
| 3,436,046 A | 4/1969 | Valeska |
| 3,471,031 A | 10/1969 | Coplan |
| 3,481,483 A | 12/1969 | Harvey |
| 3,508,664 A | 4/1970 | Lessard |
| 3,599,599 A | 8/1971 | Jones |
| 3,893,570 A | 7/1975 | Vogt |
| 3,910,417 A | 10/1975 | Cook |
| 3,918,670 A | 11/1975 | Doherty |
| 3,941,250 A | 3/1976 | Ott |
| 3,965,588 A * | 6/1976 | Long .................. 108/116 |
| 4,006,826 A | 2/1977 | Rich |
| 4,051,953 A | 10/1977 | Shoaf |
| 4,057,123 A * | 11/1977 | Erickson ............... 181/286 |
| 4,071,146 A | 1/1978 | Batts |
| 4,087,006 A | 5/1978 | Schill |
| 4,087,127 A * | 5/1978 | Lotta .................. 297/14 |
| 4,094,414 A | 6/1978 | Thiot |
| 4,103,781 A | 8/1978 | Sterling |
| 4,126,231 A | 11/1978 | Derwent-Wryde |
| 4,171,748 A | 10/1979 | Fabian |
| 4,209,156 A | 6/1980 | Kashden |
| 4,252,242 A | 2/1981 | Tudor |
| D259,228 S | 5/1981 | Fabian |
| D261,704 S | 11/1981 | Parker |
| 4,360,109 A | 11/1982 | Kurtz |
| D271,546 S | 11/1983 | Smith |
| D276,195 S | 11/1984 | Smith |
| 4,488,651 A | 12/1984 | Bishop |
| 4,632,255 A | 12/1986 | Kennedy |
| 4,674,578 A | 6/1987 | Bexten |
| 4,721,212 A | 1/1988 | Lowe |
| 4,723,665 A | 2/1988 | Benedict |
| 4,750,627 A | 6/1988 | Myers |
| 4,771,895 A | 9/1988 | Steiner |
| 4,775,056 A | 10/1988 | Inglis |
| 4,819,812 A | 4/1989 | Demarest |
| 4,856,661 A | 8/1989 | Guillen |
| 4,862,611 A * | 9/1989 | Wright .................. 248/214 |
| 4,863,081 A | 9/1989 | Gabbert |
| 4,881,353 A | 11/1989 | Braendel |
| 4,897,971 A | 2/1990 | Durston |
| 4,958,738 A | 9/1990 | Lee |
| 5,011,029 A | 4/1991 | Sugasawara |
| 5,014,954 A | 5/1991 | Merl |
| 5,019,126 A | 5/1991 | Post |
| D324,784 S | 3/1992 | Rose |
| 5,165,555 A | 11/1992 | Anatalio |
| 5,181,685 A | 1/1993 | Ostapowicz |
| 5,190,170 A | 3/1993 | Steiner |
| 5,332,109 A | 7/1994 | Johnson |
| 5,337,905 A | 8/1994 | Gast |
| 5,348,260 A | 9/1994 | Acevedo |
| 5,405,065 A | 4/1995 | Olson |
| 5,413,297 A | 5/1995 | Adams |
| 5,437,065 A | 9/1995 | Sakawa |
| 5,499,725 A | 3/1996 | Palumbo |
| 5,505,317 A | 4/1996 | Rulis |
| 5,533,774 A * | 7/1996 | Cavanaugh ............... 296/66 |
| 5,535,896 A | 7/1996 | Morgan |
| 5,566,843 A | 10/1996 | Kruska |
| 5,570,642 A | 11/1996 | Lehrman |
| 5,607,066 A | 3/1997 | Hebberd |
| 5,592,787 A | 6/1997 | Ophardt |
| 5,702,010 A | 12/1997 | Liang |
| 5,816,419 A | 10/1998 | Lamson |
| 5,819,670 A * | 10/1998 | O'Connor et al. ............ 108/48 |
| 5,855,027 A | 1/1999 | Macedo |
| 5,906,015 A | 5/1999 | Hilgar |
| 5,934,637 A | 8/1999 | Robinson |
| 5,950,845 A | 9/1999 | Harris |
| 5,950,882 A | 9/1999 | Scott |
| 5,984,250 A | 11/1999 | Connor |
| 5,996,506 A | 12/1999 | Woytovich |
| 6,065,618 A | 5/2000 | Stetler |
| 6,152,419 A | 11/2000 | Bender |
| 6,193,084 B1 | 2/2001 | Oliver |
| 6,196,398 B1 | 3/2001 | Lowe |
| 6,206,210 B1 | 3/2001 | Reed |
| 6,269,503 B1 | 8/2001 | Betker |
| 6,308,641 B1 * | 10/2001 | Kingbury ............... A47B 5/04 108/42 |
| 6,338,463 B1 | 1/2002 | Babitz |
| 6,394,289 B1 | 5/2002 | Panchihak |
| 6,464,086 B1 | 10/2002 | Klein |
| 6,464,091 B1 | 10/2002 | Nagasaki |
| 6,568,546 B1 | 5/2003 | Huang |
| 6,712,228 B2 | 3/2004 | Lowe |
| 6,721,967 B2 | 4/2004 | Braxton |
| 6,722,511 B1 | 4/2004 | Lowe |
| 6,871,749 B2 | 3/2005 | Bostick |
| 6,991,204 B2 | 1/2006 | Ay |
| 7,040,589 B2 | 5/2006 | Wang |
| 7,063,381 B2 | 6/2006 | Scahill |

(56) References Cited

U.S. PATENT DOCUMENTS

| | | | |
|---|---|---|---|
| 7,165,689 B2 | 1/2007 | McDaniel | |
| D551,009 S | 9/2007 | Pulliam | |
| D551,481 S | 9/2007 | Loveless | |
| D562,118 S | 2/2008 | Bell | |
| 7,513,375 B2 | 4/2009 | Wenzler | |
| D613,983 S | 4/2010 | Klein | |
| 7,806,280 B1 | 10/2010 | Perkins | |
| 7,886,918 B1 | 2/2011 | Sauer | |
| 7,891,034 B2 * | 2/2011 | Smith | 5/655 |
| 7,900,883 B2 | 3/2011 | Portz | |
| 7,908,711 B2 | 3/2011 | Johnson | |
| 8,141,296 B2 | 3/2012 | Bem | |
| 8,284,018 B2 | 10/2012 | Ibsies | |
| 8,376,297 B2 | 2/2013 | Portz | |
| 8,381,661 B2 * | 2/2013 | Hilde | A47B 43/00 108/42 |
| 8,540,087 B1 | 9/2013 | Skaer | |
| 2008/0190873 A1 | 8/2008 | Rocket | |
| 2011/0094985 A1 | 4/2011 | Austin | |
| 2012/0074076 A1 | 3/2012 | Restrepo | |
| 2012/0137534 A1 | 6/2012 | Barnard | |

FOREIGN PATENT DOCUMENTS

| | | |
|---|---|---|
| EP | 0311436 A1 | 4/1989 |
| EP | 1410732 A1 | 4/2004 |
| FR | 951154 A | 10/1949 |
| GB | 1539384 A | 1/1979 |
| WO | WO2000069314 A1 | 11/2000 |

\* cited by examiner

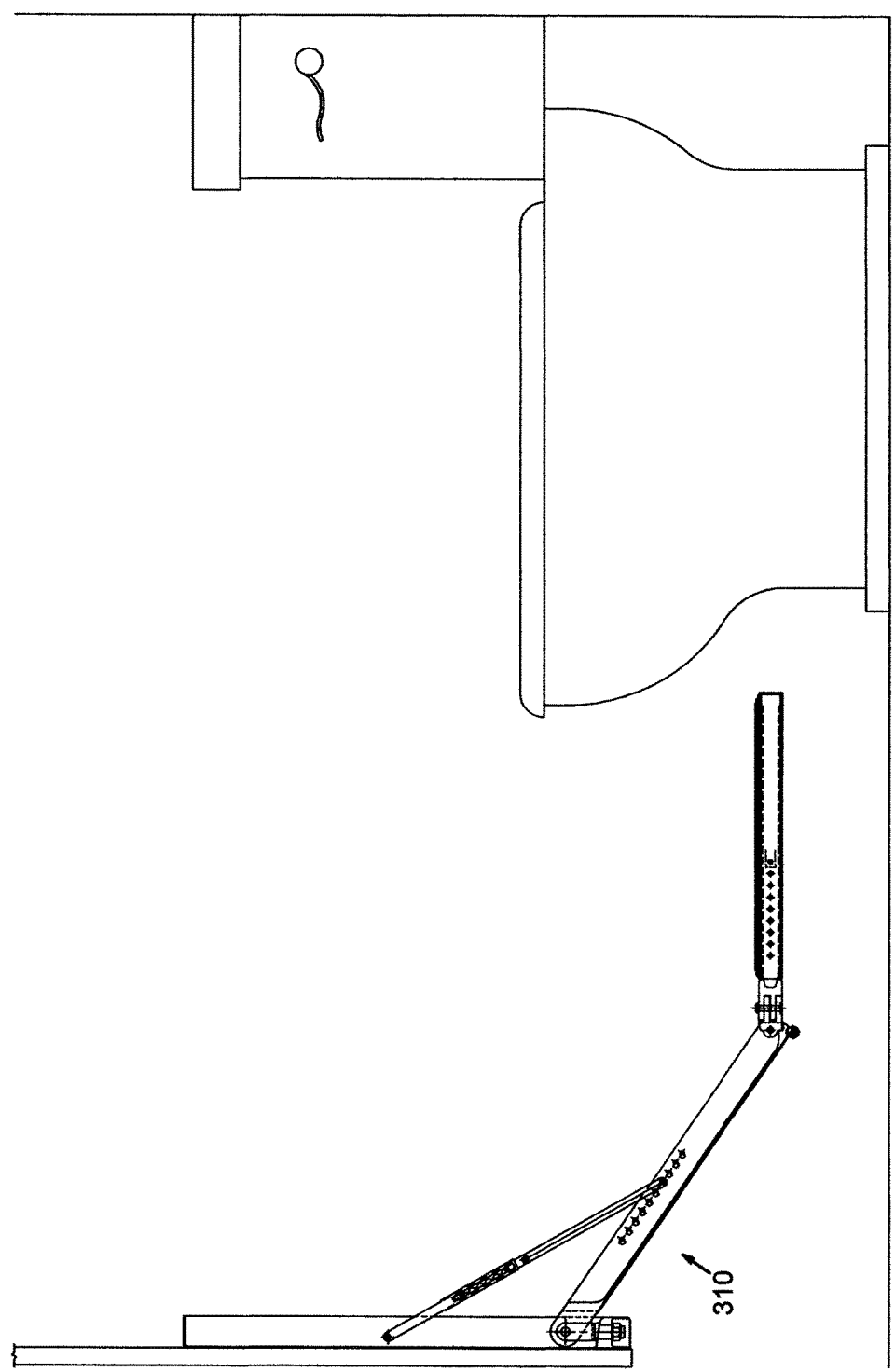

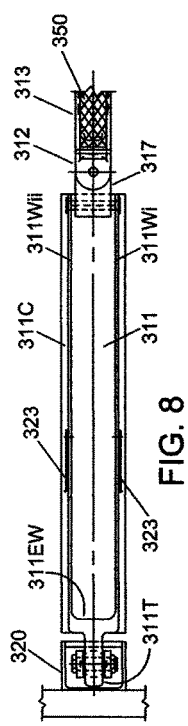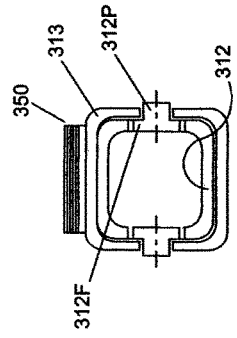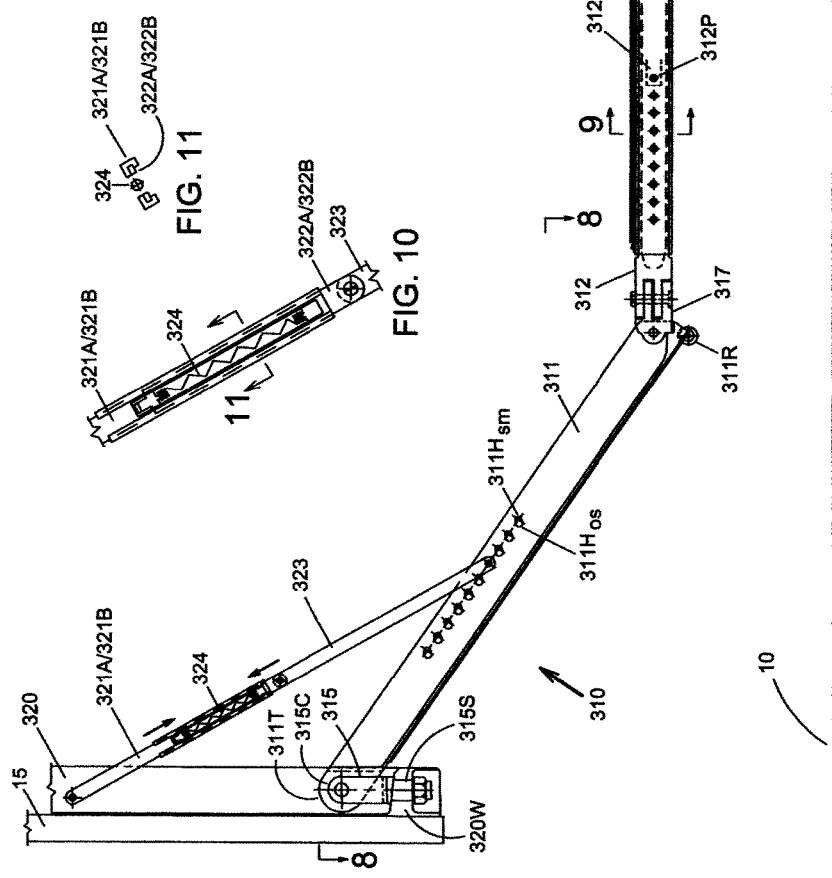

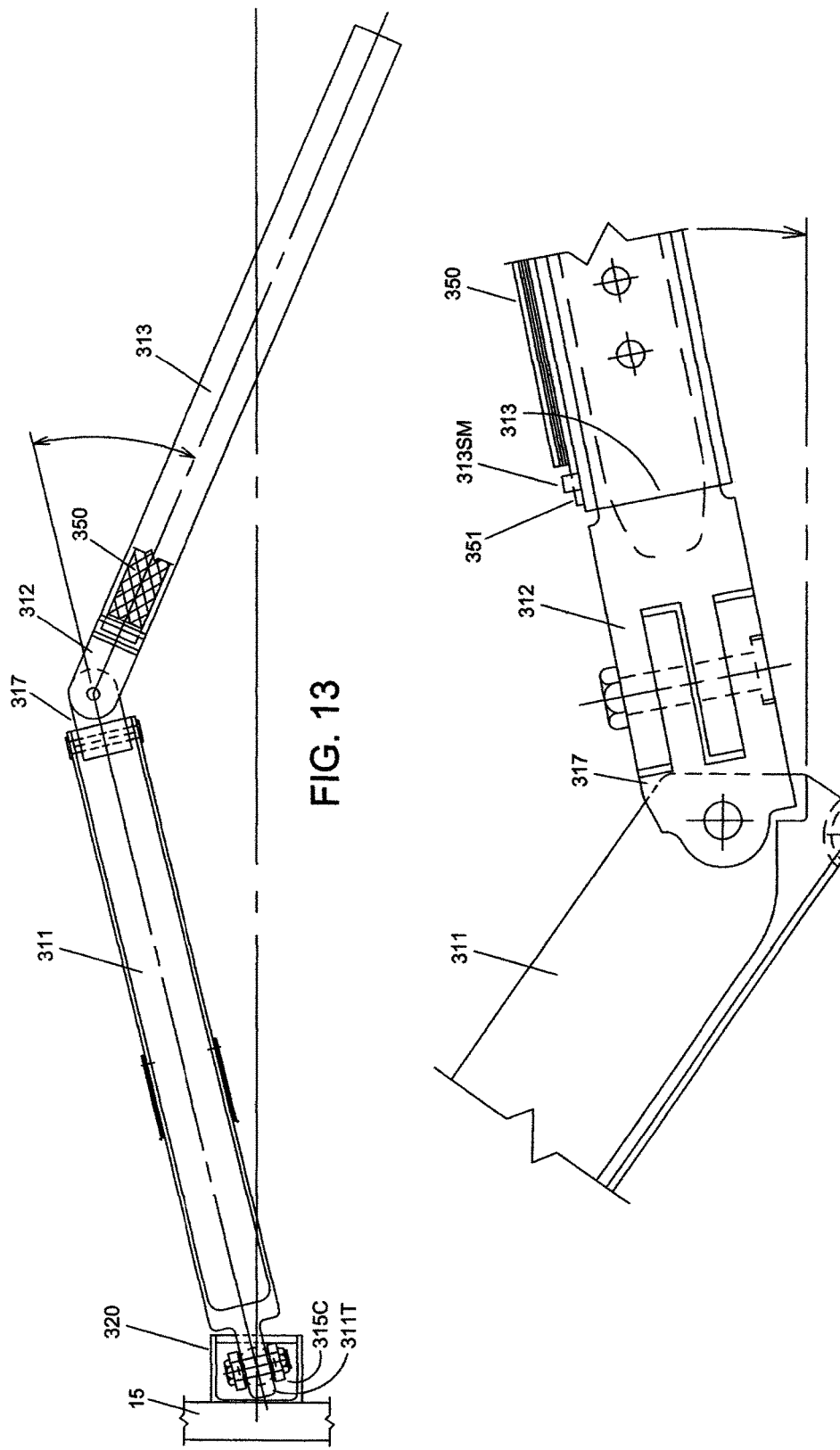

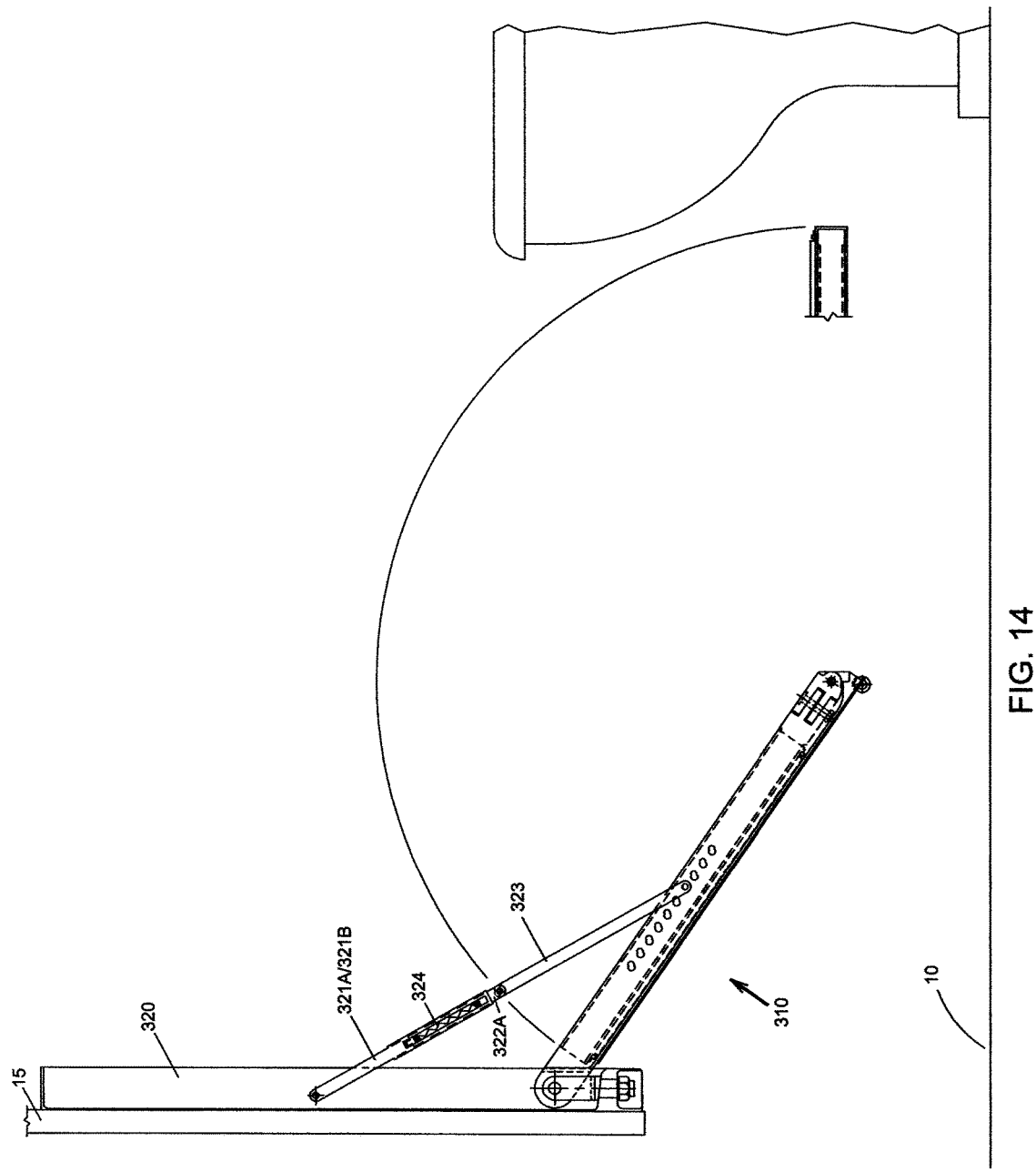

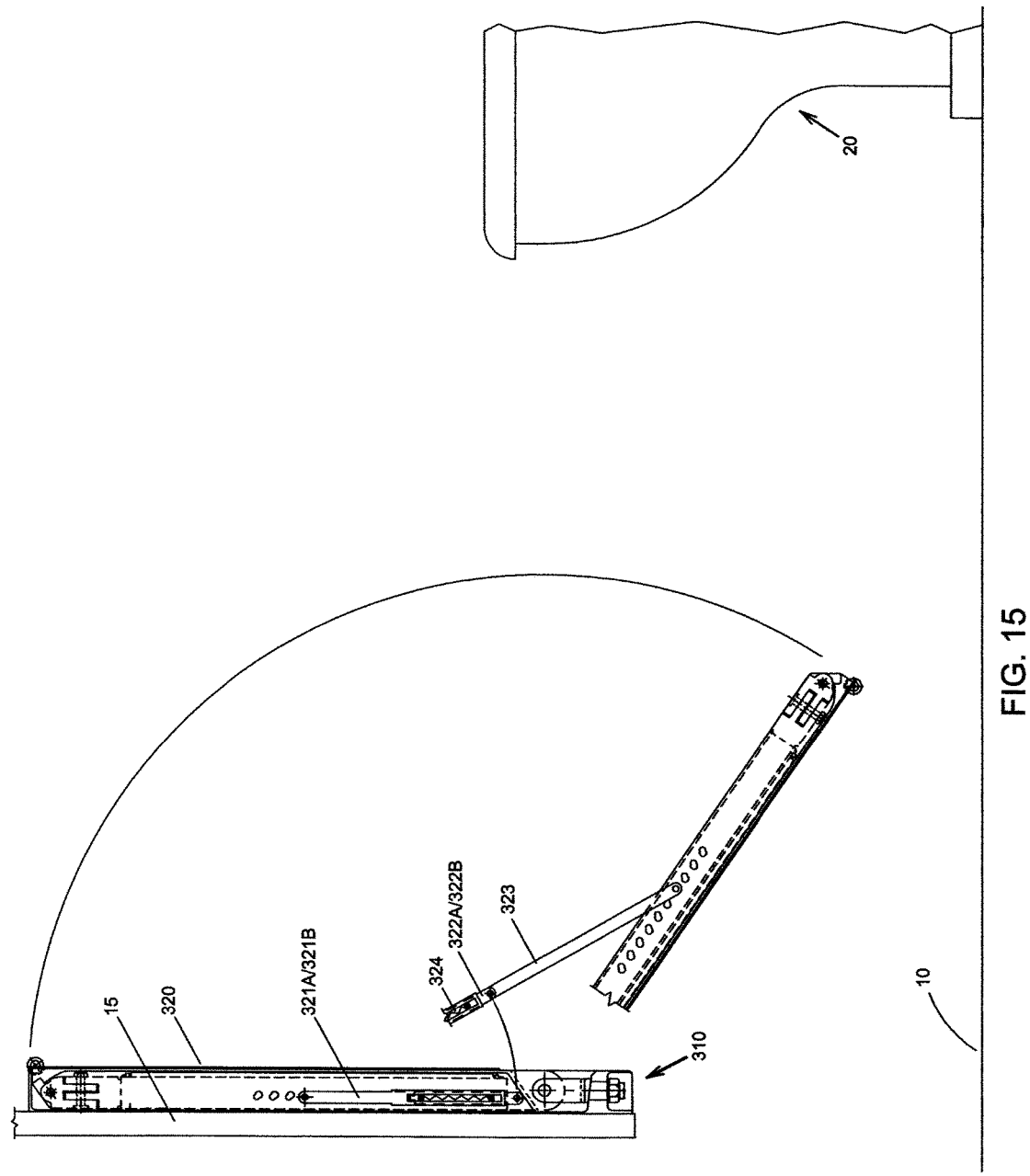

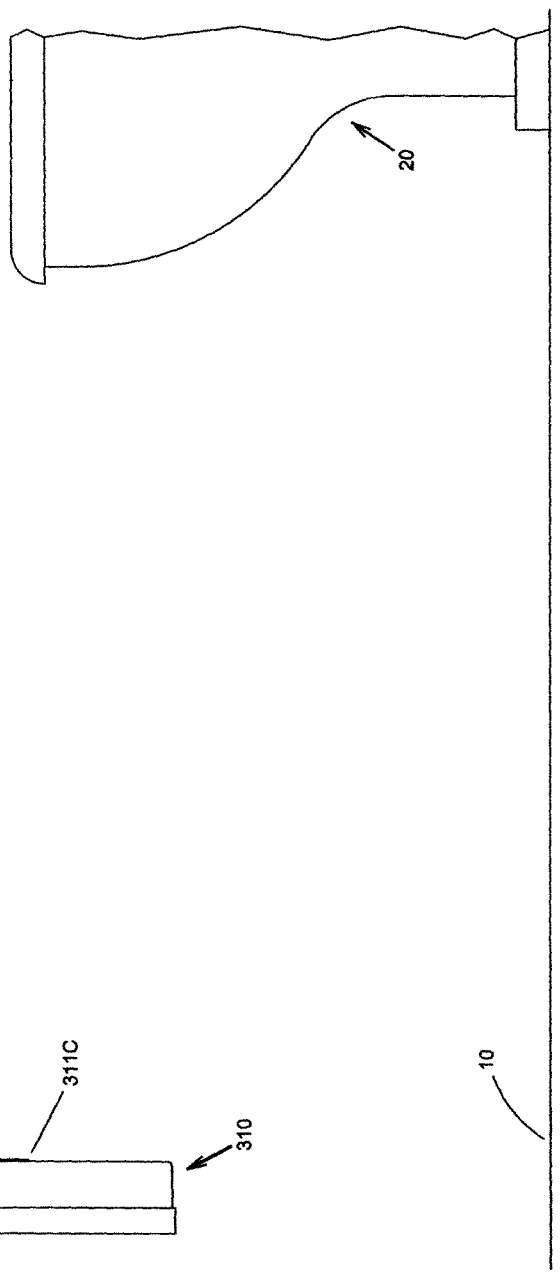

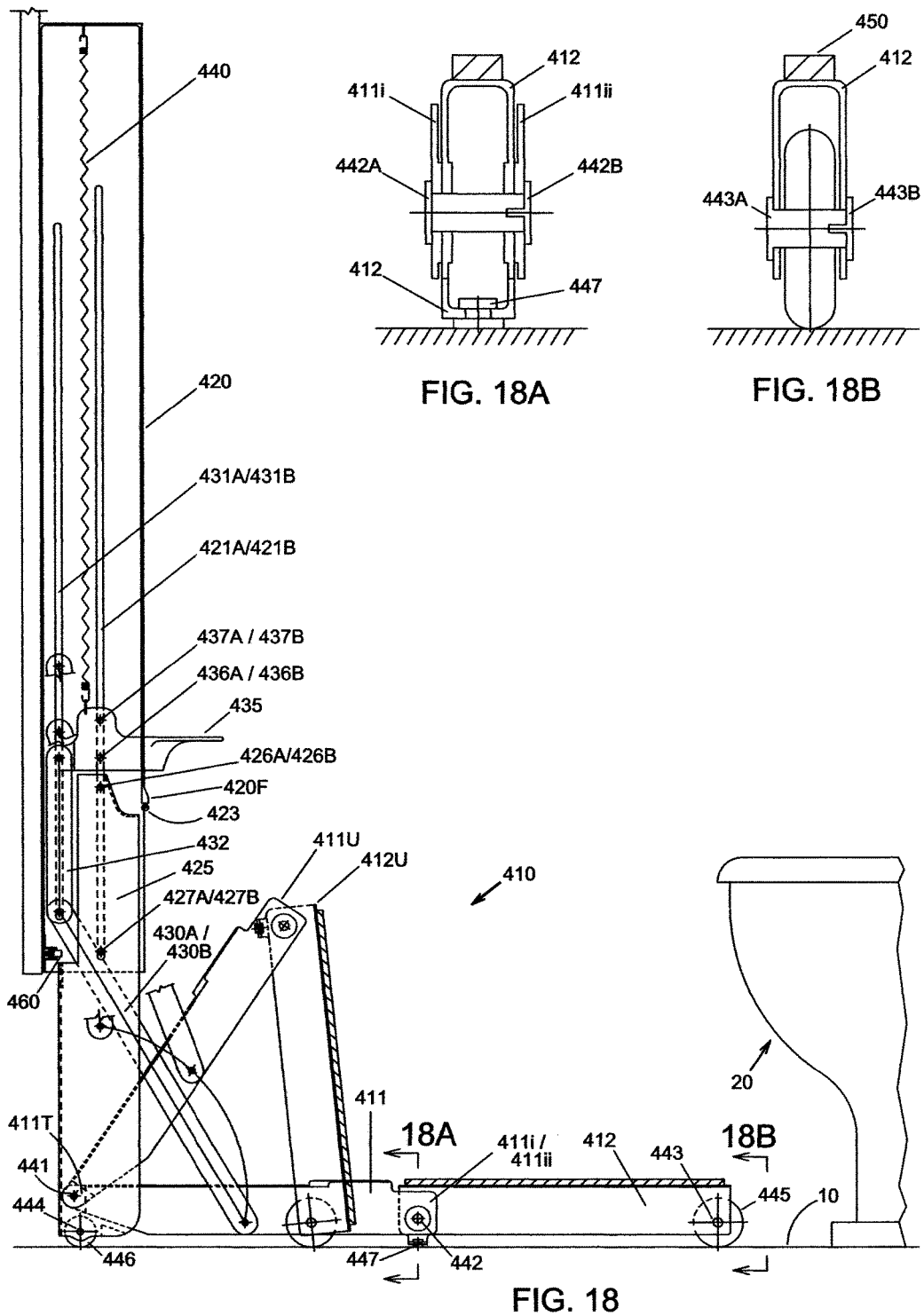

US 9,885,444 B1

SLACKS VALET MECHANISM FOR A LAVATORY

CROSS REFERENCES TO RELATED APPLICATIONS

This application claims priority on U.S. Provisional Application Ser. No. 61/685,119, filed on Mar. 12, 2012, titled "Lavatory Stall Slack Valet," and on U.S. Provisional Application Ser. No. 61/688,320, filed on May 10, 2012, titled "Slack Valet Mechanism For A Lavatory," with the disclosures of each being incorporated herein by reference.

FIELD OF THE INVENTION

This invention relates to improvements in the use of public restroom toilets, and more particularly to a means of support that may be installed upon the stall door or lavatory wall to be selectively deployed to preserve the cleanliness of a user's slacks, by preventing contact with the floor, when utilizing the toilet therein.

BACKGROUND OF THE INVENTION

Many people find using a public restroom to be an unpleasant experience, particularly with respect to the potential for unsanitary conditions therein. There have been many inventions devised to help improve those conditions, such as the disposable paper toilet seat covers that are often provided in a dispenser within the stall. However, no such protection has been devised to prevent the user's pant bottoms from contacting the floor while seated on the toilet, even though such contact may cause the user's clothing to grind against a floor that may have been dirtied from the user's own shoes when entering therein, or may have been inadvertently soiled by a previous user of the stall, or may have been subject to waste water overflowing from a neighboring toilet. While several inventions heretofore have focused on the cleanliness of a public restroom stall, as it pertains to the user's posterior contacting a toilet seat, or for providing a shelf or hook/hanger to maintain the integrity of the user's possessions (books, papers, or coat) in a position removed from the floor, nothing to date has similarly been devised to preserve the cleanliness of the users pants, even though they may be quite expensive and/or they may have just been serviced at the "cleaners." This invention is directed to a quickly deployable/stowable mechanical device that provides such protection while using a public toilet.

OBJECTS OF THE INVENTION

It is an object of the invention to provide an easily and quickly deployable means of protecting the slacks of the user of a public restroom toilet stall from the floor therein.

Further objects and advantages of the invention will become apparent from the following description and claims, and from the accompanying drawings.

SUMMARY OF THE INVENTION

The invention disclosed herein provides several embodiments of a mechanical device that may be secured within the stall or to a wall of a public restroom, to have an arm therein be deployed between his/her legs to be in proximity to the floor, to serve in supporting the person's slacks or a woman's skirt, while using the toilet. The arm maintains the user's slacks at a suitable distance away from the floor to prevent the slacks/skirt from contacting the floor, which quite often may be unclean just from ordinary foot traffic, particularly on rainy days. The floor may also have become soiled from a previous user of the stall having urinated while standing. This invention enables the current user to deploy the mechanical device to protect his/her clothes while using the toilet, and to quickly stow the device once finished, to be able to easily exit from the stall.

One embodiment of the current invention may include a "valet" arm with a first end having a mechanical connection with the stall door of the lavatory that permits the arm to be moveable between a stowed position and a deployed position. The arm may pivot from the stowed position, in which a portion of the valet arm being distal from the mechanical connection with the stall door is nonetheless in proximity to the door, to the deployed position, in which at least a portion of the valet arm is in proximity to a toilet therein to receive the user's slacks thereon. A stop may limit pivotal travel of the valet arm from the stowed position to be at the deployed position. The stop may be a rubber bumper that may serve as a "soft" stop, as it may be subjected to some deformation by the weight of the arm and by the weight of the slacks. Alternatively, or in addition to the rubber stop, a pair of support arms may each have one end be pivotally attached to a housing, with a second end of the support arms being pivotally attached to the valet arm, to serve as a "hard" stop to positively limit pivotal travel of the valet arm at the deployed position. The valet arm may also have a sleeve slidably received thereon, which may be translatable between two positions. The slidable sleeve being in the first position—a retracted position—may more easily permit pivoting of the valet arm away from the stall door, without striking the user or impacting the positioning of the user within the stall, and thereafter, the sleeve may be extended to the second position to be suitably located between the legs of the person. An end of the sleeve (or the plain valet arm without a sleeve) may have a fixed or a pivotable slacks retention arm section extending therefrom that may serve to prevent the user's slacks from sliding off the end of the angled valet arm/sleeve.

A slight variation of that embodiment may have that pivotable slacks retention arm section be disposed/deployed in a generally horizontal position and be of a sufficient length to extend in closer proximity to the toilet in the horizontal position, in order to receive the user's slacks comfortably thereon without them having any tendency towards sliding off. In this embodiment, the pivotable slacks retention arm section may serve as the "valet" arm that receives the user's slacks thereon, and the arm that is pivotally connected to the stall, which may then be referred to as the "main" arm, may just serve to assist in positioning the pivotable "valet" arm section in proximity to the toilet. A sleeve may also be received on the pivotable "valet" arm section to provide incremental adjustability for the reach provided towards the toilet, to account for differences in various toilet stall configurations for different stall door-to-toilet distances. The pivotable "valet" arm section and sleeve may be pivoted together to retract into the main arm, which itself may retract into the housing, in the stowed position, and may be maintained therein using magnets, or a latch, or other retaining means. Each "arm" of the pair of support arms in this embodiment may include first and second arm sections that are slidable with respect to each other, and are normally biased into a retracted relation. When the main arm and pivotable valet arm section are moved into the deployed position, the pair of support arm sections will be biased to remain in the retracted relation by a spring. If the user inadvertently steps on, or deliberately tries to stand on the arm, the slidable sets of support arms will extend as the spring biasing is overcome by the excessively large force, and may prevent damage to the unit. A roller on the bottom of the arm(s) may accommodate slidable contact with the stall's floor. In this embodiment, a secondary joint may be vertically oriented to permit the pivotable valet arm section to also rotate with respect to the main arm, by rotating about a vertically oriented axis. Also, the main arm may also have an analogous secondary joint to also permit its rotation about a vertical axis proximate to the stall door. Both of these secondary joints may serve to permit the arms to rotate away from a generally central, in-line position, if the user inadvertently kicks the unit. These joints permitting rotation about a vertical axis may be biased to normally be restored back to the central, in-line position once the user has ceased applying a sideways force to the arm(s). The pivotable valet arm section may have a plurality of peelable anti-microbial cover sheet layers stacked on a top surface to provide a hygienic contact surface for the slacks for successive user's of the slacks valet.

Another embodiment of the current invention may further include spring biasing and a catch that may be triggered to cause automatic retraction of the arms of the mechanism back into the housing. A handle may be provided to cause extension of the arms therefrom, and engagement of the catch. Release of the catch may be by a button located on the housing of the unit. In addition, the knob that is used to actuate the latch of the stall door may be wired to the catch, so that if a user seeks to egress from the stall without first raising the slacks valet mechanism, which could result in damage to the device and possibly prevent the stall door from opening fully, the catch will be tripped to cause the device's automatic retraction.

BRIEF DESCRIPTION OF THE DRAWINGS

FIG. 6 is a side view of a public restroom stall, with a toilet therein, and with a third embodiment of the slacks valet mechanism of the current invention installed on the stall door, and being shown in the deployed position.

FIG. 7 is the side view of FIG. 6, with the stall door-mounted slacks valet embodiment therein being shown enlarged.

FIG. 8 is a top view of the stall door-mounted slacks valet embodiment of FIG. 7.

FIG. 9 is a cross-sectional view through the sleeve and pivotable arm section of the slacks valet embodiment of FIG. 7.

FIG. 10 is an enlarged detail view of one of the sets of support arms of the slacks valet embodiment of FIG. 7.

FIG. 11 is cross-sectional view through the set of support arms of FIG. 10.

FIG. 12 is an enlarged detail view of the point between the main arm and the pivotable arm section of the slacks valet embodiment of FIG. 7, just prior to the pivotable arm section being fully pivoted into the deployed position.

FIG. 13 is a top view of the slacks valet embodiment of FIG. 7, shown with the main arm having been rotated counter-clockwise with respect to the housing, and with the pivotable arm section and sleeve having been rotated clockwise with respect to the main arm.

FIG. 14 is the side view of the slacks valet embodiment of FIG. 7, but shown with the pivotable arm section having been pivoted to be nested within the main arm.

FIG. 15 is the side view of FIG. 14, but shown with the main arm and nested pivotable arm section after having been rotated to be nested within the housing.

FIG. 16 is the side view of FIG. 15, but shown as a non-transparent view, to highlight the clearance of the stowed mechanism relative to the toilet, and relative to the area of the floor needed by the user for ingress/egress into/out from the stall.

FIG. 18 is the slacks valet mechanism of FIG. 17, shown with the first and second arm sections in both the deployed position and in a position in which they are initially being retracted to prepare the mechanism for its translation into the stowed position within the housing.

FIG. 18A is an enlarged cross-sectional view through the wheel at the second end of the second arm of FIG. 18.

FIG. 18B is an enlarged cross-sectional view through the pivotal connection between the first and second arms, as seen in FIG. 18.

DETAILED DESCRIPTION OF THE INVENTION

Figure 1:
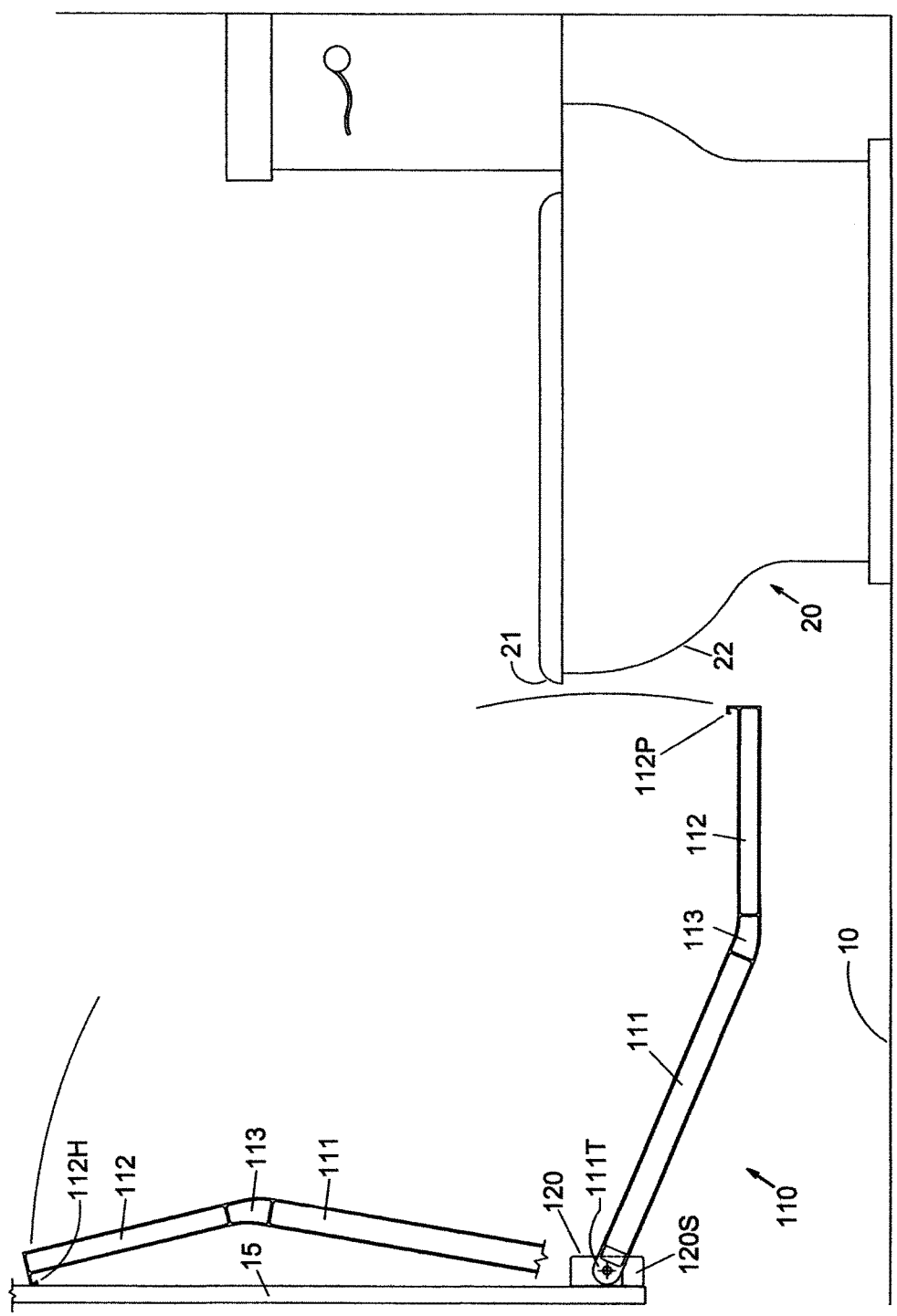
FIG. 1 an enlarged side view of a public restroom stall, with a toilet therein, and with a first embodiment of the slacks valet of the current invention installed on the stall door, and being shown in the stowed and the deployed positions.

FIG. 1 shows a first embodiment of the present invention—slacks valet mechanism 110. The slacks valet mechanism 110 may be mounted to the door of a lavatory stall, and could also be mounted to a wall of the lavatory where it may function in a similar manner. The slacks valet 110 is a basic embodiment, which principally overcomes the problems encountered when attempting to provide protection to a user's slacks when the user seeks to utilize the toilet in a public lavatory stall.

There are a number of problems that each of the mechanisms herein must overcome in order to be functional in a deployed position, while lending itself to quick and convenient stowage in a minimally invasive volume, because such lavatory stalls are generally very compact. The stowed mechanism must not impinge upon the stall door's cycle of rotation from its closed position to its full open position. While in the open position, the door may remain slightly displaced from the wall of the stall by contact of a combination stop/coat hanger with a stall wall, to thereat permit the user to freely ingress into and egress out from the space in the stall. The mechanism also must not unreasonably impair the ability of the user to move within the small space, particularly when it becomes necessary to bend over to lower his/her trousers/skirt, at which time the deployed mechanism normally will need to occupy the space between the user's legs and be in reasonably close proximity to the toilet, to protect the slacks/skirt from the floor, but the device also must not interfere with the person's motion in being seated on the toilet, or his/her motion in arising from the seated position to be standing once again, or prevent raising of their garment, as he/she prepares to egress from the stall. In addition, when the device is deployed it must be in reasonably close proximity to the ground, so as not to interfere with the user's freedom of leg movement that may otherwise be obstructed by their slacks being supported up near their knees.

The slacks valet mechanism 110 may include a first arm portion 111 that may have a rigid transition portion 113 into a second arm portion 112, which may be at an angle to first arm portion 111. A bracket 120 may be fixedly secured at a generally central position on the stall door 15 using any suitable fastener arrangement and type, including, but not limited to, screws. The first arm portion 111 may be pivotally mounted to bracket 120 using any suitable, pinned arrangement. Merely to be exemplary, the end of first arm portion 111 may terminate in a tongue 111T, which may have a hole therein, and which may be received between the prongs of a clevis on bracket 120, and be pivotally secured thereto using a bolt through holes in the prongs and through the hole in the tongue, with the bolt being secured thereto using a lock washer and a nut.

The downward pivotal travel of first arm portion 111 may be limited to the position shown in FIG. 1 by the use of a stop 120S. Stop 120S may be mechanically attached to bracket 120, or be integrally formed therewith. In one embodiment, the stop 120S may be formed of a rigid material, which may serve as a "hard" stop, by preventing any further pivotal movement by the arm portions, once arm portion 111 contacts the stop. In another embodiment, stop 120S may be a separate part that may be formed of hard rubber or another elastomeric material, that may experience some deformation once contacted by arm portion 111. This may serve to prevent damage to the arm portion 111 and/or bracket 120, in case the arm is inadvertently leaned on, perhaps when the user bends over to retrieve and lift his/her slacks.

The free end of arm portion 112, being distal from transition portion 113, may have a protrusion 112P extend generally orthogonally away from the arm, to help prevent the user's slacks from slipping off the end of the arm portion.

The arm portion 112 could be lengthened to extend further towards the toilet 20 to better negate the consequences of such sliding of the user's slacks (potential contact with the floor), but the extended length may tend to obstruct movement of the arm portion 112 past the bowl portion 22 of toilet 20. The protrusion 112P may have a hook portion 112H which may be used in combination with a latch on the stall door to secure the arm in the upwardly disposed, "stowed" position. Instead of the hook portion 112H and latch, magnets may be used to releasably retain the arm in the stowed position.

The degree of the angular relationship utilized between arm portion 111 and arm portion 112 may be minimized by locating the bracket 120 on the lowest portion of the stall door, which normally is roughly one foot above of the stall floor 10. Having the second arm portion 112 be roughly parallel to the floor 10 of the stall is desirable to reduce the tendency of the user's slacks to slide off of arm portion 112, even where protrusion 112P has been utilized. Although a longer length protrusion 112P may be used in that effort, the longer the length of the protrusion, the more the transition portion 113 will need to intrude into the volume of the stall, when the device is in the stowed position, which the user might accidentally tend to hit with his/her head when they bend over. This is a consideration, because not every user of the stall may necessarily feel inclined to utilize the device on every occasion, despite its advantageous nature, particularly someone who may be working outdoors and may be wearing work clothing that is already soiled, instead of dress slacks or an expensive suit.

Therefore, the amount that the transition portion 113 intrudes into the stall may be reduced by lessening the degree of the angular relationship utilized between arm portion 111 and arm portion 112, but with the above noted tradeoff as to retention of the user's slacks. One other tradeoff to be noted, in relation to having the length of the arm portion 112 being configured to be in closer proximity to toilet 20, is that the longer are the arm portions 111 and 112, the more awkward may be the user's experience in seeking to move the arm from the stowed position to its deployed position between their legs, which may require the user to back over and straddle the toilet, to be clear of the arm so as not be struck by its movement, or may require the user to step to the side of the compact stall during its travel and to subsequently step over and straddle the arm portion 112.

Figure 2:
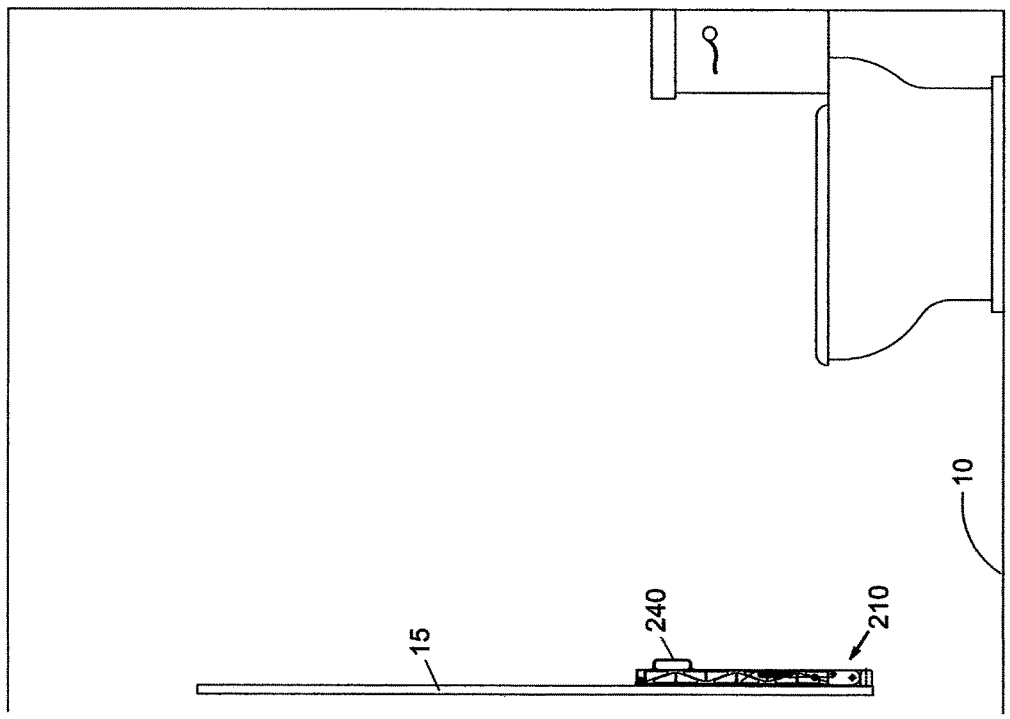
FIG. 2 is a side view of a public restroom stall, with a toilet therein, and with a second embodiment of the slacks valet mechanism of the current invention installed on the stall door, and being showed in the stowed position.

So, while the basic slacks valet mechanism 110 may be functional in terms of satisfying the requirements for stowage and deployment, the above factors create a tension between making modifications to it for more elegant satisfaction of the initially stated problems, in order to provide a higher level of utility for the user within the lavatory stall. Therefore, greater utility may be provided by the second embodiment of the slacks valet mechanism of the current invention, which is shown in the stowed position in FIGS. 2 and 3.

Figure 3:
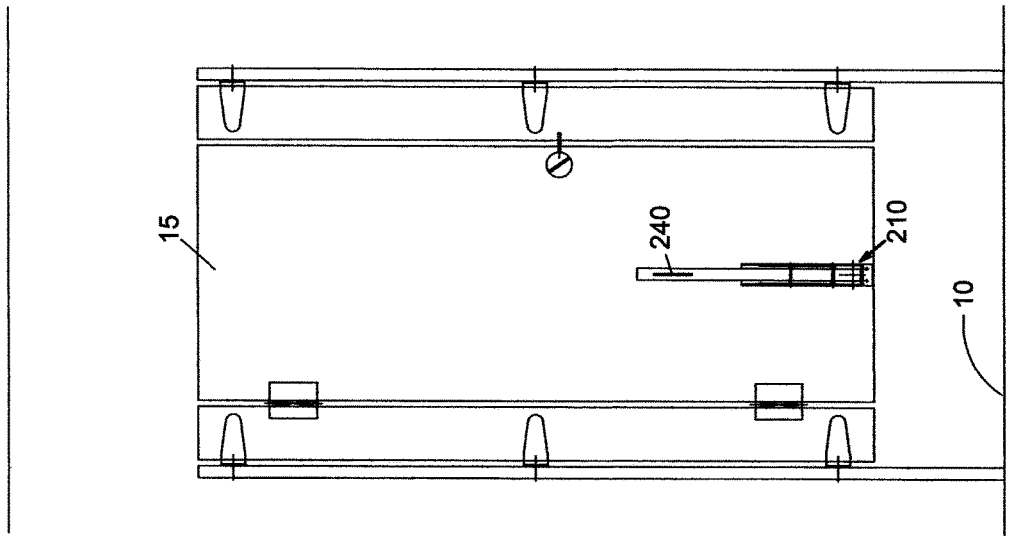
FIG. 3 is a view looking at the stall door-mounted slacks valet mechanism of FIG. 2.

As seen in FIG. 3, the slacks valet mechanism 210 may be positioned on the lower portion of the stall door 15, and, as mentioned earlier, it may generally be centered laterally on the door. However, it should be noted that, during the installation of the mechanism onto the stall door 15, the primary concern is not that it be centered on the door, but rather that it be mounted so that it extends to be generally centered upon the toilet itself, which may be slightly off-center with respect to the door, depending on the layout and construction of the stall. It should be further noted that when the mechanism is mounted within an oversized stall that is configured to also be used by a person who is wheel-chair bound, that the device may be mounted on a wall of such a stall, instead of its door.

Figure 4:
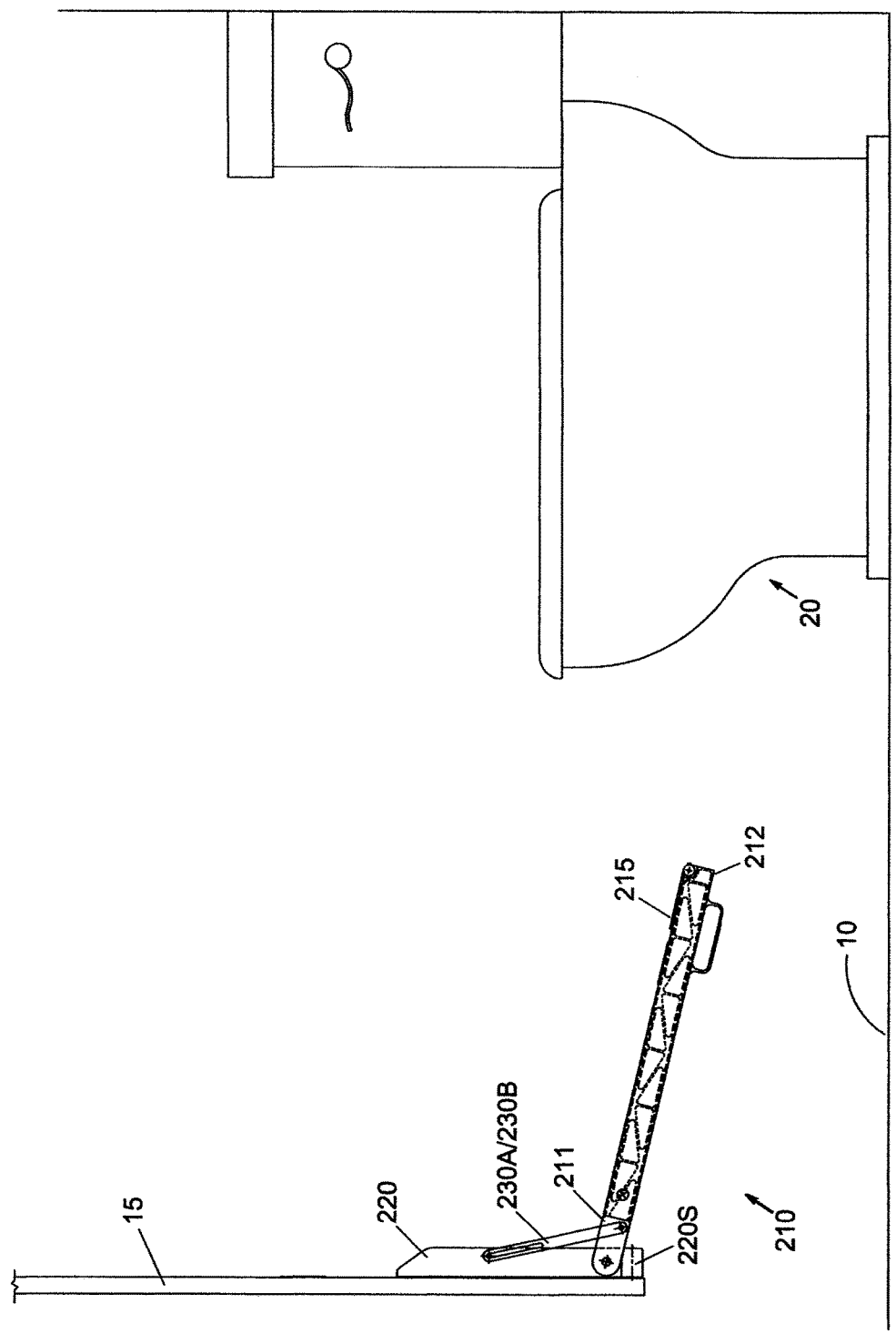
FIG. 4 is the slacks valet mechanism of FIG. 2, but shown with the arm having been pivoted away from the stowed position against the stall door.

In FIG. 4, an arm 211 of the slacks valet mechanism 210 is shown rotated down and away from mounting bracket 220 until it contacts a stop 220S on the bracket. Stop 220S may be configured to be the "soft" stop or the "hard" stop previously discussed in regard to the slacks valet mechanism 110. In addition to, or instead of using stop 220S, a pair of support arms 230A/230B may each have one end be pivotally attached to the side walls of bracket 220, and may also each have a second end be pivotally attached to the arm 211. Where the support arms 230A/230B are used in combination with a flexible "soft" stop 220S, they may be configured so that they provide rigid support for the arm after the soft stop has been deformed somewhat, and may themselves thereafter serve as a hard stop to limit any further downward pivoting of the arm 211.

The lower ends of each of the support arms 230A/230B that are pivotally attached to the arm 211 may be so attached using a simple pivotable connection, whereby a pin, or a bolt, etc., may be received through a hole in the support arm 230A, through a hole in the tongue portion 211T of arm 211, and then through a hole in the support arm 230B, and may be secured thereat (e.g., using a nut). The upper pivotal attachment of the support arms 230A/230B to the walls of the bracket 220 may be through the use of a slotted hole 231 in each of the support arms, and a round hole in each of the bracket 220 side walls. As seen in FIG. 5B, the slotted hole 231 would permit translation of the upper end of the support arms relative to the mounting bracket 220, in addition to any necessary rotation about the pin 232. The slot would need to extend far enough toward the middle of each of the support arms 230A/230B, so as not to limit upward travel of the support arms by contact with the pin 232, when the arm 211 is being pivoted into the stowed position.

Conversely, the upward extent of the slot, and also the length of the arms 230A/230B, may be configured so that the top of the slotted hole does contact the pin 232, to limit downward travel of the support arms, and therefore also limits downward travel of arm 211, which may occur after a measured amount of deformation of stop 220S has occurred. Where a hard stop 220S is used to limit travel of arm 211, the support arms 230A/230B may be configured to also limit such travel, but which may preferably occur just as the stop 220S is contacted by arm 211, if not immediately before, to thereby reduce the bearing stresses caused within the hinge pin used for pivotal mounting of the arm 211 to the mounting bracket 220, which may serve to reduce the required local wall thickness of bracket 220.

Figure 5:
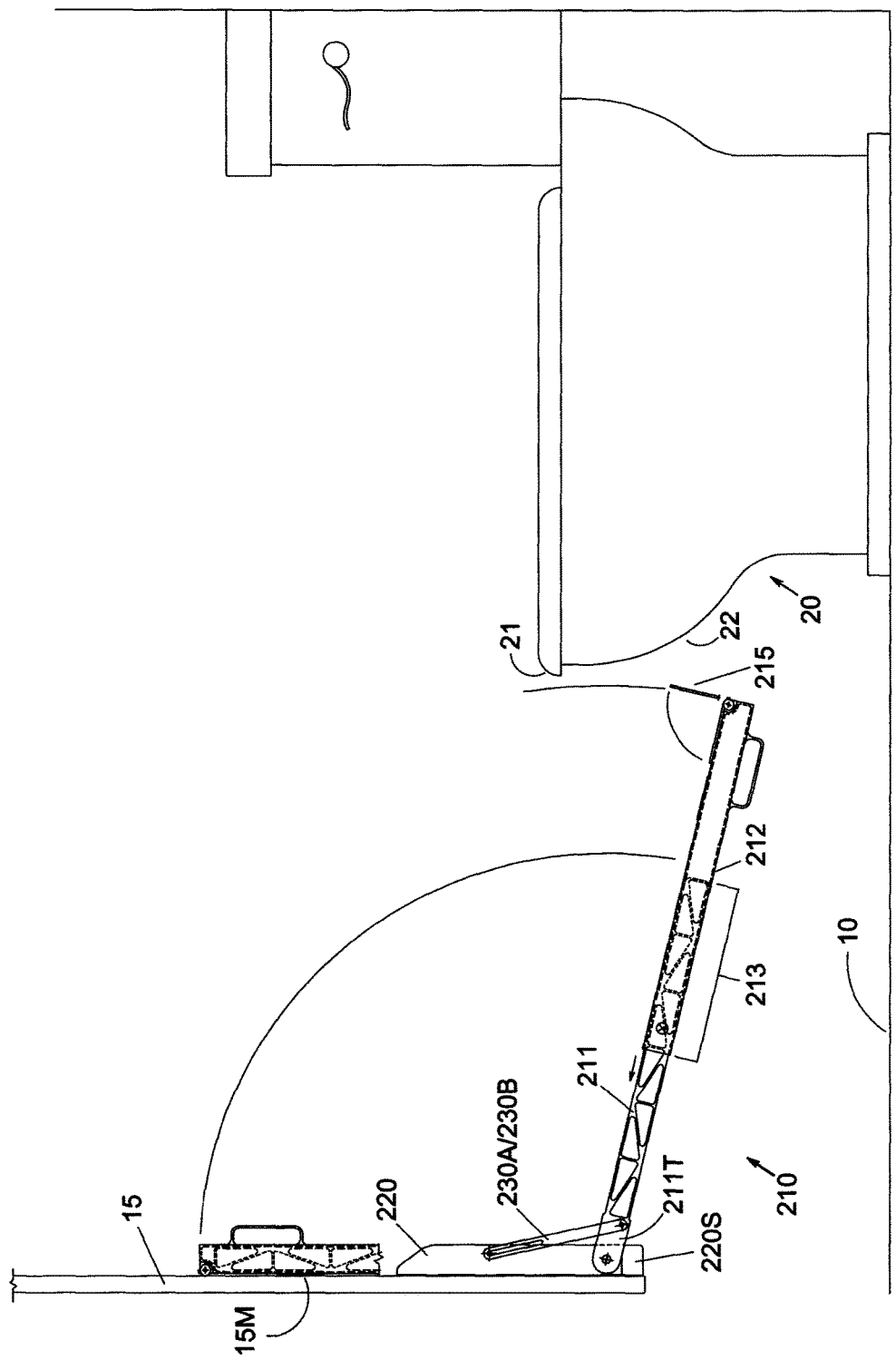
FIG. 5 is the slacks valet mechanism of FIG. 4, but shown in the fully deployed position, with a sleeve on the arm having been extended to be in close proximity with the toilet bowl, and with a pivotable arm section thereon having been pivoted up toward the toilet to prevent a user's slacks from inadvertently sliding down off of the angled sleeve.
Figure 5A:
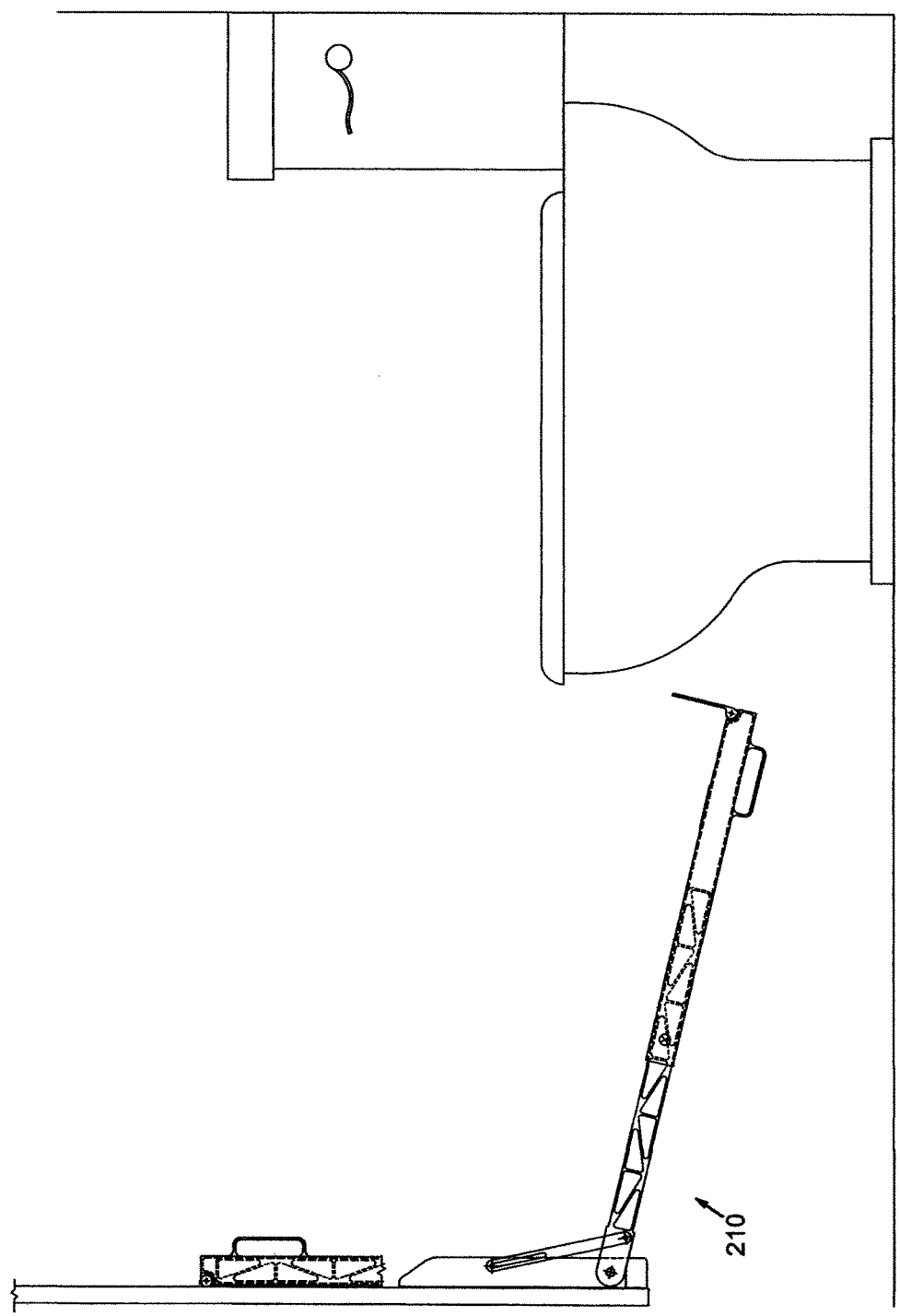
FIG. 5A is the slacks valet mechanism of FIG. 5.

A sleeve 212 may be slidably disposed upon arm 211, and may be configured to slidably travel from a position in which the sleeve is retracted (FIG. 4), so that a substantial portion of arm 211 is nested within the sleeve (the sleeve is drawn up over the arm toward the stall door), to a position in which the sleeve is extended into the stall to be in proximity to the toilet 20 (FIG. 5). To provide for stability for the sleeve 212, which must adequately support the user's slacks when lowered thereon, as well as any other incidental contact, the sleeve may preferably have sufficient length so that when it is extended, a sufficient but modest portion 213 of arm 211 may still be nested therein. Portion 213 may thereby serve as a joint for the interconnection between arm 211 and sleeve 212, and may be sized/configured with closer tolerances between those parts for a smooth sliding fit. A stop may be used to limit this sliding travel of the sleeve 212 relative to the arm 211.

Figure 5C:
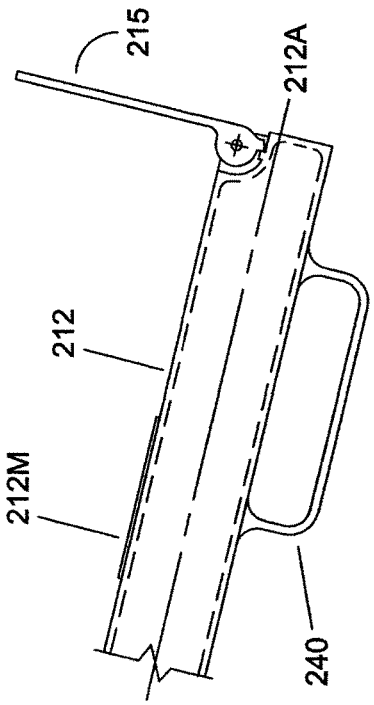
FIG. 5C is an enlarged detail view of the pivotable arm section of the slacks valet mechanism of FIG. 5.
Figure 5B:
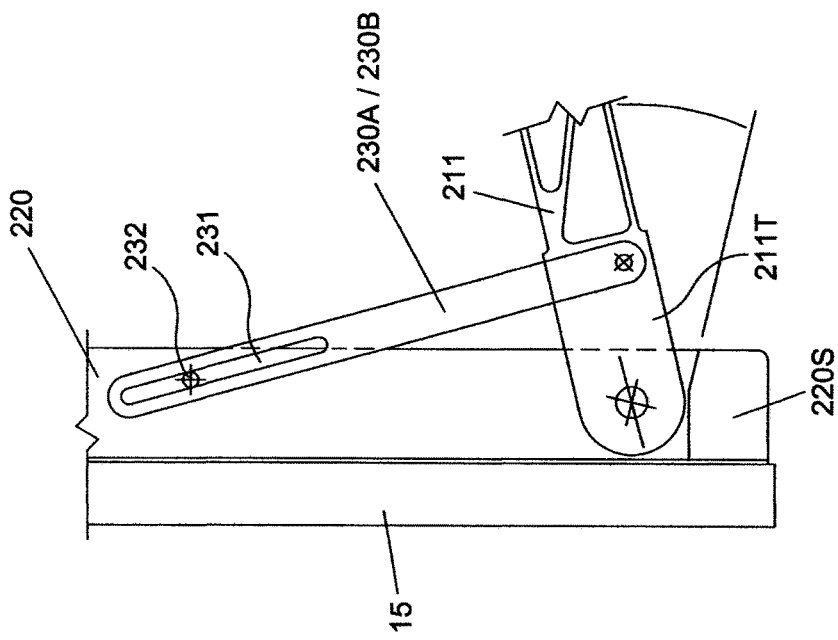
FIG. 5B is an enlarged detail view of the hinging of the arm of the slacks valet mechanism of FIG. 5, to the stall door.

The end of sleeve 212 may have a pivotable arm section 215 connected to and extending therefrom that may serve to prevent the user's slacks from sliding off the end of the angled sleeve. The pivotable arm section 215 may be pivoted to be flush against the sleeve 212, as seen in FIG. 4, so that the slacks valet mechanism 210 can be moved into the stowed position, or it may be pivoted, once the sleeve has been extended (or even prior to its extension) to protrude away from the sleeve 212 at an angle to the axial direction 212A of the sleeve, as seen in FIGS. 5 and 5B. The pivotable arm section 215 may extend orthogonally away from the sleeve 212. A stop may be used to limit pivotal travel of the arm section 215, as seen in FIG. 5C.

The arm 211 and sleeve 212 may each be made of a metallic material, or may be made of wood, or may be formed of a suitable plastic material in order to be lightweight, so as to not negatively impact the stall door supports when the slacks valet mechanism is retrofitted onto an existing stall door. To create sufficient strength for the arm 211 when it is formed of plastic, which may also desirably permit a certain amount of flexure, a truss or framework of integrally formed stiffeners may be utilized, as seen in FIG. 5. The sleeve 212 may be any shape that may encompass the arm 211. Where the truss of arm 211 is formed with an elongated rectangular upper plate, an elongated rectangular lower plate, and with the stiffeners spanning therebetween, possibly with an integral shear web positioned along its mid-plane such that the stiffeners extending outward therefrom, to thereby form a generally rectangular-shaped envelope for its cross-section, the sleeve 212 may be formed to have a hollow rectangular shape.

A handle 240 may be positioned on one side of the sleeve 212, as seen in FIGS. 2-5 and FIG. 5C, to more easily permit the user to disengage the arm 211/sleeve 212 combination from the means that serves to retain the device in the stowed position, such as the magnet 212M on the sleeve and the corresponding magnet 15M on stall door 15 (or on housing 220, where the housing extends upward sufficiently).

Other utility may be provided by a third embodiment of the slacks valet mechanism of the current invention, which is shown in the extended position in FIG. 6. As seen in FIG. 6, the slacks valet mechanism 310 may also be positioned on the lower portion of the stall door 15, and may be secured thereto using fasteners that may attach the housing 320 to the stall door. Slacks valet mechanism 310 may have a first arm 311 that may be pivotally attached to the housing 320, which is seen in the enlarged view of FIG. 7. Instead of the first arm 311 being pivotally attached directly to the walls of the housing 320, it may instead be pivotally mounted to a pin 315 that may be pivotally mounted to the bottom of housing 320. First arm 311 may be formed to have a channel as its cross-sectional shape, which may have a first end closed off by an end wall 311EW (FIG. 8), and from which may extent a tongue 311T. The tongue 311T may be pivotally received in a clevis 315C on pin 315, using, for example, a bolt and a nut. The pin 315 may have a shaft portion 315S that may be pivotally received in a hole in a bottom wall 320W of the housing 320. The end of the shaft of pin 315 may be threaded up to a shoulder that protrudes out beyond the bottom of housing wall 320W, so that the external threads may be able to receive a lock nut thereon, without having the nut serving to clamp the pin to the housing wall, thereby permitting the pin to experience pivotal movement relative to the housing, as well as a small amount of vertical travel in certain instances. The top of housing wall 320W may, as seen in FIG. 7, be angled downward towards the toilet, with the portion of the pin 315 below the clevis 315C terminating in another shoulder that has a correspondingly angled surface that may normally be in contact with the top of the wall 320W (e.g., when the arm 311 is in-line with the toilet).

With this arrangement, the pivotal connection of the first arm 311 with the clevis 315C of pin 315 may permit the arm 311 to pivot between the stowed and the deployed positions, while the pivotal connection of the shaft of pin 315 within the hole of housing wall 320W may further permit the first arm 311 to rotate laterally within the stall, about a vertical axis, as seen in FIG. 13. This lateral rotation would permit the arms of the slacks valet mechanism 310 to rotate away from its central, in-line position with the toilet, if the user inadvertently kicks the unit, with the angled surface of pin 315 no longer then being in flush contact with the angled surface of the top of the wall 320W, as the pin would be raised vertically upward by such rotation. However, this displacement may serve to create a restoring (biasing) force, with the weight of the deployed and displaced arms tending to be biased by gravity to counter-rotate to restore the arms back to the original central position, once the user has ceased applying a sideways force to the arm(s). A smooth surface finish for the angled top surface of housing wall 320W and for the angled surface of contact for pin 315 may help to better accommodate this center biasing, by reducing frictional forces that may work against such sliding contact therebetween. A Teflon or other suitable coating may be applied to each of those faying surfaces to better promote sliding contact, to facilitate centering of the arm(s).

Just like slacks valet mechanism 210, pivoting of the arm 311 for slacks valet mechanism 310 may similarly be limited by a pair of support arms. The same support arm arrangement used for limiting travel of arm 211 may also be used to limit travel of arm 311, or a couple of other support arm arrangements may instead be advantageously used, as discussed hereinafter.

A simple support arm arrangement may consist of two pairs of upper and lower support arms, where the upper and lower support arms are pivotally connected to each other, with the upper end of the upper support arm being pivotally connected to the housing, and with the lower end of the lower support arm being pivotally connected to the first arm 311. This simple support arm arrangement may analogously resemble the arms used to limit spreading of the rails of a folding ladder. When the first arm 311 is pivoted into its deployed position, this support arm arrangement would serve as a hard stop and prevent any further pivoting by the arm 311.

A slightly different support arm arrangement may instead be used to serve as a "soft" stop, to thereby accommodate incidental stepping onto the arms by a user of the device. This alternative support arm arrangement is shown in FIG. 7, in the enlarged view of FIG. 10, and in FIG. 10A, where its component parts are also illustrated separately. The lower support arm 323 for each pair of support arms in this arrangement may be a simple link, with mounting holes at each end. The upper portion of the arrangement may include an upper support arm member 321A/321B with flanges that form a track to receive a support arm member 322A/322B therein, in a slidable relation (see FIG. 11). The upper support arm member 321A/321B and the slidable support arm member 322A/322B may each have a respective slotted opening (321S and 322S) oriented along its axial (lengthwise) direction. The lower end of the slotted opening 321S on the upper support arm member 321A/321B, and the upper end of the slotted opening 322S on the slidable support arm member 322A/322B may each have a respective post (321P and 322P) protruding into the slotted openings (321S and 322S). With the support arm member 322A/322B being slidably engaged within the track of the upper support arm member 321A/321B, a compression spring 324 may be seated upon each of the posts, and may thereby bias the slidable support arm member to fully nest within the upper support arm. A flange 322F on the end of the slidable support member 322A/322B may limit the biased travel of the slidable support arm member relative to the upper support arm member 321A/321B in the fully nested position, by contacting the upper end of the slotted opening 321S, as seen on the left-hand side of FIG. 10A. With the slidable support member 322A/322B engaged in this travel limiting position with respect to the upper support arm member 321A/321B, through biasing of the compression spring 324, the upper support arm member and the slidable support arm member may generally behave as a single unit, when pivotally connect with the lower support arm 323, and as installed per FIG. 7. The arm 311 may be pivoted outward from the stowed position, and the combination of the upper support arm member 321A/321B, the slidable support member 322A/322B, and the lower support arm member 323 will act similar to the simple support arm arrangement that resembled the arms used to limit spreading of the rails of a folding ladder. The spring constant (K) of the compression spring 324 need only be sufficient to provide biasing to overcome the weight of the mechanism and perhaps the weight of the user's slacks. But, if a user of the device inadvertently steps upon the arm 311 of the mechanism, the applied force would overcome the spring biasing, and the arms would behave then as a "soft" stop and permit downward movement, which may serve to prevent damage to the device, as the support member 322A/322B would slide downward in the track with respect to the upper support arm member 321A/321B. This support arm arrangement may also be used with the slacks valet mechanism 210.

Figure 10A:
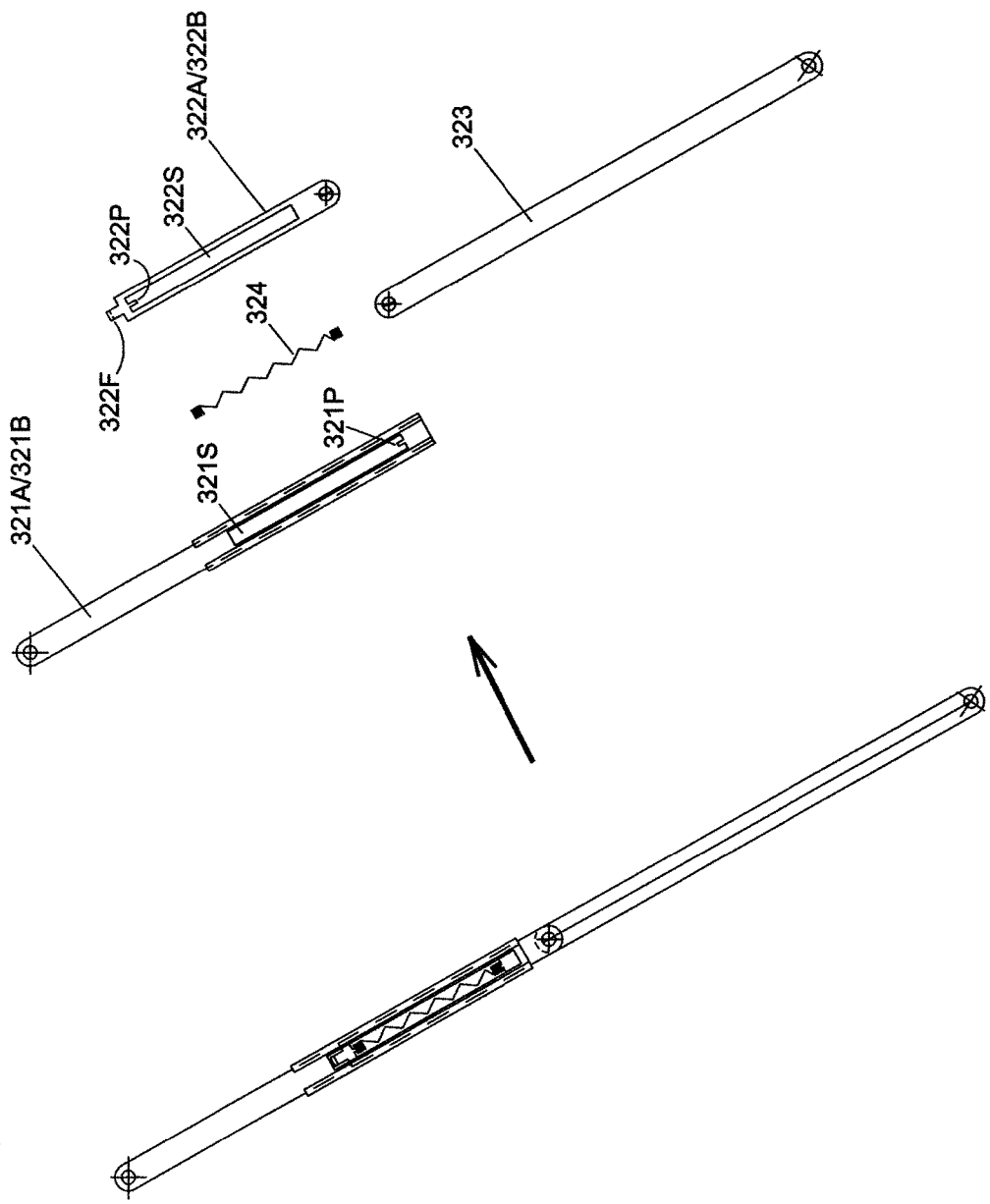
FIG. 10A is a view showing the set of support arms of FIG. 10, accompanied by an exploded view of the component parts of that support arm set.

Another alternative embodiment of the support arm arrangement may be seen by the assembled view and exploded view of its component parts within FIG. 10A. This embodiment of the support arm arrangement may include a pair of upper support arms 330A/330B, and a pair of lower support arms 331A/331B. The upper support arms 330A/330B may each have an upper end be pivotally mounted to respective side walls of housing 320. The lower support arms 331A/331B may each have a lower end be pivotally mounted to respective side walls of arm 311 (FIGS. 7-8). This pivotal attachment of the lower end of support arm 331A/331B may be by a pin through a hole in the lower end of the arm(s) and through a hole in the walls of the arm 311. To provide adjustability for the angle of the deployed arm 311 relative to the housing and adjustability of the distance of its lower end from the floor, the pin may be a double-headed rivet, where the heads of each rivet (manufactured and/or bucked) are on opposite sides of the arms 331A/331B, with the shaft of the rivet passing through the hole in the arms, so that the heads prevent the rivet from being removed from the arms. The inner head of the rivet for each arm may be respectively received through an oversized hole $311H_{OS}$ in the walls $311_{Wi}/311_{Wii}$ of the arm 311 (FIG. 7). The oversized hole $311H_{OS}$ in the walls $311_{Wi}/311_{Wii}$ of the arm 311 may interconnect with a smaller hole $311H_{SM}$. After the inner head of the rivets are respectively received through the oversized holes $311H_{OS}$ in the walls $311_{Wi}/311_{Wii}$ of the arm 311, the shaft of the rivet may be snapped into the smaller hole $311H_{SM}$, which may be sized to be just sufficiently large enough to provide a clearance fit with the shaft of the rivet. However, the interconnection between the oversized hole $311H_{OS}$ and the smaller hole $311H_{SM}$ may be sized to provide a slight interference fit with the diameter of the shaft of the pin, which may be overcome by the application of a small amount of force being applied by a user's hand or suitable tools.

A series of these interconnected hole pairs ($311H_{OS}$ and $311H_{SM}$) may be respectively distributed along the walls $311_{Wi}/311_{Wii}$ of the arm 311, as seen in FIG. 7. A particular set of hole pairs ($311H_{OS}$ and $311H_{SM}$) in each of the walls $311_{Wi}/311_{Wii}$ of the arm 311, for this pivotal attachment of the lower end of support arm 331A/331B, may be selected to custom locate the end of the arm 311 in desirable proximity to floor 10, for a particular lavatory stall door height. Thus the interconnected hole pairs may serve to provide flexibility for the installation of the slacks valet mechanism 310 for various lavatory stall configurations.

In one arrangement of the nested pairs of support arms 330A/330B and 331A/331B, slidable travel therebetween into the fully nested position may be limited by a protrusion on one of the arms, such as protrusion $331A_S/331B_S$ on the lower support arms (FIG. 10), serving as a "hard" stop by engaging a portion of the upper support at the point where slidable travel is to be limited (e.g., the relative positioning of the support arms as seen in FIG. 6). When it is necessary to move the arm 311 of slacks valet mechanism 310 into the stowed position, the upper and lower arms may simply nest even further, to accommodate the shortened distance between the respective pivotal ends of the upper and lower support arms, as seen in FIG. 15.

Figure 10B:
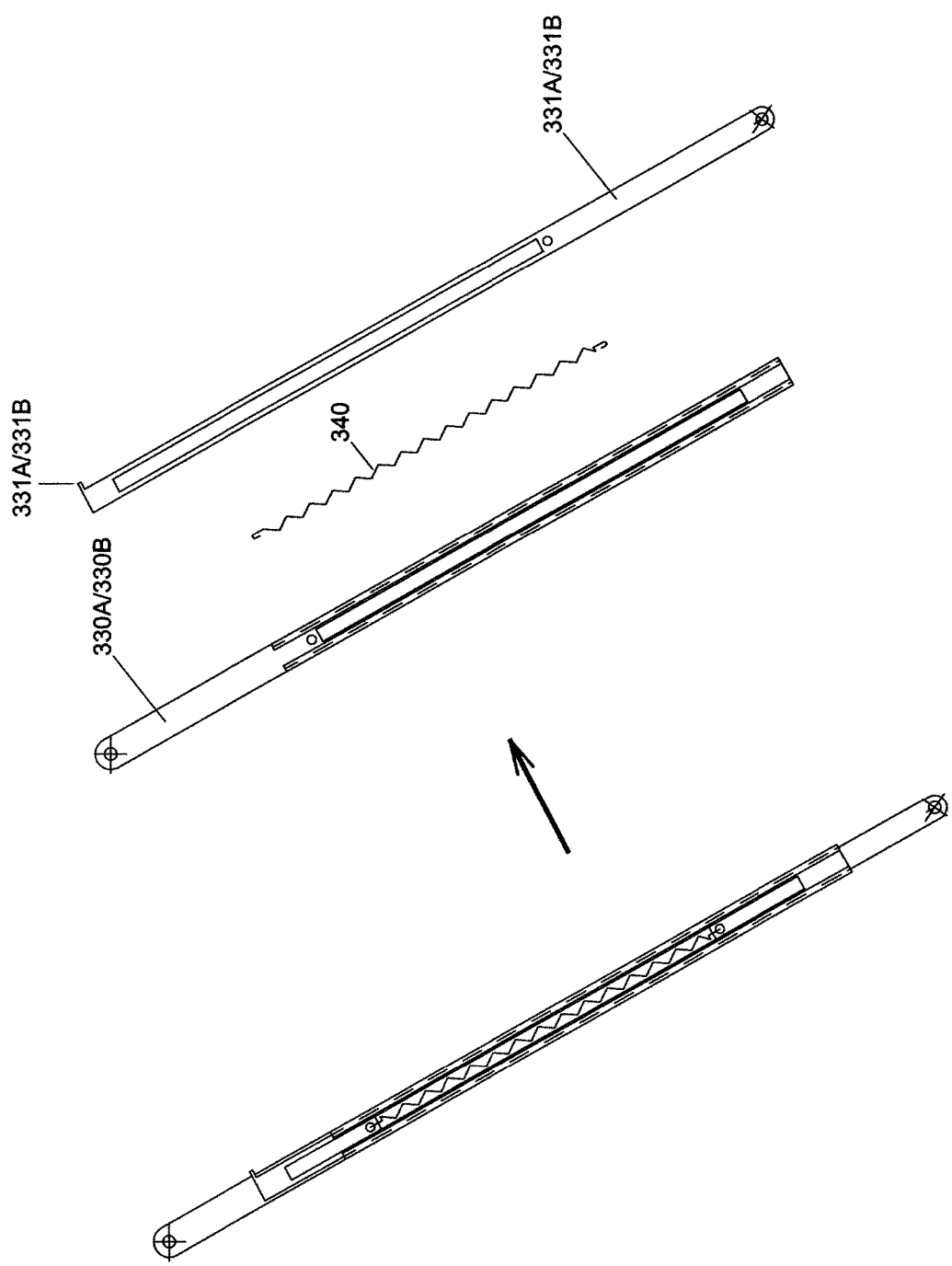
FIG. 10B is a view showing an alternate embodiment of support arms usable with the slack valet mechanism of FIG. 7, accompanied by an exploded view of the component parts of that alternate support arm set.

In another arrangement of the nested pairs of support arms 330A/330B and 331A/331B, slidable travel therebetween is not limited by the "hard" stop formed by a protrusion, and may generally be controlled by a spring. In this embodiment, each of the upper support arms 330A/330B and the lower support arms 331A/331B may have a slotted opening therein, being oriented along its axial (lengthwise) direction, as seen in FIG. 10B. The upper support arms 331A/331B may each have a round hole therein that is located just above the end of its slotted opening, and the lower arms 330A/330B may have a hole therein that is located just below its slotted opening. When the upper support arms and the lower support arms are slidably engaged, a portion of the slotted holes of the corresponding pairs of upper and lower support arms may overlap, and when the support arms are positioned as seen in FIG. 7 for the deployed position, the upper end of the slot for the lower support arms 331A/331B may extend above and beyond the position of the round hole in the upper support arms 330A/330B, and the lower end of the slot for the upper support arms 330A/330B may extend below and beyond the position of the round hole in the lower support arms 331A/331B. As so positioned in FIG. 7, a spring 340 may be received within the overlapping slotted openings in the pairs of support arms, and may have an over-center loop at a first end of the spring be received through the round hole above the slotted opening for the upper support arms 330A/330B, and may have an over-center loop at a second end of the spring be received through the round hole below the slotted opening for the lower support arm 331A/331B. Once received into the holes, the over-center loops of the spring 340 may be crimped to close off the opening in the loop to have the ends of the spring be secured thereto against dislodgment from the motion of the support arms. The spring may have a length configured such that it essentially has little or no stored energy (is neither compressed nor extended from its nominal length) when the arm 311 is maintained in the deployed position of FIG. 7. The spring may also be configured to have sufficient stiffness so that the weight of the device may cause negligible expansion of the spring in this position.

The spring may therefore provide a primary travel limiting position at which the arm 311 may be deployed to, where the spring may serve as a "soft" stop to generally limit travel of the arm to be as seen in FIG. 7, but may also permit further travel under certain circumstances, such as where the user may inadvertently or intentionally step upon the arms of the device. Whenever this may occur, the pivotally mounted ends of the support arms would be caused to move farther apart from each other, causing the round holes in the arms to move apart, thereby causing the spring 340 to be extended and store energy according to Hooke's Law ($F=-kx$). A roller 311R positioned on the bottom of arm 311 may prevent damage to the arm, and may provide rolling contact with the floor 10, particularly for the case where the stall door 15 is opened while the arm is pushed down against the floor. When the user removes their foot from the arm(s) of the device to release the force applied thereto, the stored energy in spring 340 may cause the arms to return to the normal deployed position of FIG. 7.

When the arm 311 is manually rotated from the deployed position of FIG. 7 into the stowed position of FIG. 15, the pivotally mounted upper ends of the support arms 330A/330B and the pivotally mounted lower ends of the support arms 331A/331B are caused to move closer to each other, consequently causing the round holes in the respective arms to move closer than they are in the normal deployed position, thereby causing the spring 340 to be compressed, and to again store energy. Therefore, the spring utilized in this arrangement may be configured for dual functionality as it may act as both a tension spring and as a compression spring, with the coils being configured for such dual usage. (Note that one of skill in the mechanical arts would recognize that other arrangements of the spring and support arms may be constructed to exclusively utilize only a tension spring or only a compression spring).

The pivotal mounting of the upper end of the upper support arms 330A/330B is illustrated in FIG. 14, as being closer to the rear of the housing 320 (nearer to stall door 15), than to the front of the housing. FIG. 15 shows that this mounting position results in the upper support arms 330A/330B and lower support arms 331A/331B are both oriented generally vertically, when in the stowed position, and with the line of force imposed by the stored energy of spring 340, when in that position, being disposed to the inside of (closer to the stall door than) the horizontal axis for the pivotal mounting of the tongue 311T of arm 311 to the clevis 315C of pin 315. Therefore, once the arm 311 has been moved into the stowed position, the spring works to bias the arm to remain in the stowed position. Use of a magnet, a latch, or other means of securing the mechanism in the stowed position would therefore not be necessary, but may nonetheless be utilized for the sake of redundancy.

As seen in FIG. 7, the end of arm 311 being distal from its pivotal mounting with pin 315 may have a second arm section 312 be pivotally attached thereto. The arm 312 may have a simple pivotal connection with arm 311, so that it may pivot to be nested within the walls $311_{Wi}/311_{Wi}$ of the arm 311, as seen in FIG. 15. Pivoting of the arm 312 may be limited to the deployed position by a stop, as seen in FIG. 12, or instead a ratcheting arrangement may also be used, which may work in conjunction with the angular changes in the arm 311 that may occur through the use of the hole pairs ($311H_{OS}$ and $311H_{SM}$) in each of the walls $311_{Wi}/311_{Wi}$ of the arm 311, to generally maintain the arm 312 in the horizontal position.

In order to enable the arm 312 to also be able to rotate relative to a vertical axis, similar to the way that arm 311 may both pivot and rotate through its connection with pin 315, the arm 312 may be rotatably mounted with respect to a swivel joint member 317, which may be pivotally mounted to the arm 311, as shown in detail in FIG. 12. (It should be noted that the terms "pivot" and "rotate" may be considered interchangeable; however, hereafter in this specification, the term "pivot" will generally be used to describe rotational/counter-rotational motion about an axis being orthogonal to the page for FIG. 12 for movement of the mechanism between the stowed and retracted position—up and down movement about a horizontal axis being on or parallel to the lavatory stall door and parallel to the stall floor; whereas the term "rotate" is generally used to describe rotational/counter-rotational motion about an axis running from the top of the page to the bottom of the page for FIG. 12—a vertical axis in the actual lavatory stall being generally perpendicular to the stall floor). Therefore, this permits the arms 311 and 312 to deflect laterally, and to pivot even in opposite directions (see e.g., FIG. 13—counter-clockwise rotation for arm 311 and clockwise rotation for arm 312), which may accommodate the user striking the side of the device, with the arms adjusting (rotating) to the movement of the user in the stall. The pairs of upper and lower support arms 330A/330B and 331A/331B may offer some resistance to such lateral movement of the arms; however, given the length of the arms when in the deployed position and the slidable relation between the arms of each pair, the resistance to lateral movement would normally be quite small. A torsion spring or other type of spring may be used to center bias the arm 312 with respect to the arm 311. Therefore, both the arm 311 and the arm 312 may be center biased so as to normally be in-line, to extend away from the stall door, with the arm 311 being in proximity to the toilet and generally centered therewith.

As may be seen from looking at FIG. 7, the arm 312 may extend to be in sufficiently close proximity to the base of the toilet 20, so as to extend beyond the vertical edge 21E of the end of the toilet seat 21, but due to the location of the joint member 317, it may still be able to pivot clear of the toilet while moving between the deployed and stowed positions. To accommodate varying stall wall/door arrangements, such as where the door may be positioned farther away from the toilet, a sleeve 313 may be slidably received on the arm 312. The sleeve may be configured to be incrementally extendable relative to arm 312, using a detent. For example, the sleeve 313 may have a series of holes in the side wall or walls, one of which (or one pair of which) may receive a biased detent pin that may extend outward from the arm. A spring biased detent pin may be used. Alternatively, a cut may be made in the side wall(s) of the arm, possibly being the three-sided cut seen in FIG. 7, to form an elongated and flexible wall section 312F that may act like a leaf spring, and from which may protrude an integrally formed cylinder 312P. The longer the length of the cut, the longer and more flexible will be the wall section 312F. As seen in FIG. 7 and FIG. 9, the cylinders 312P on each side wall of the arm 312 may be depressed to remove them from the corresponding holes in the sleeve, to allow movement of the sleeve 313 closer to or farther away from the toilet 20.

FIG. 16 shows the slacks valet mechanism 310 in the stowed position within housing 320. A cover member 311C may be integrally formed with or attached to arm 311 to have the base of the channel-shaped cross-section extend beyond the walls $311_{wi}/311_{wii}$ of the arm 311 (FIG. 8), so that when the arms are pivoted into the stowed position (FIG. 16), the cover may butt against the front surface of the housing 320, or may have a portion be releasably received (be nested) therein. The cover 311C being so positioned relative to the housing 320 may generally protect the mechanism from dust, dirt, etc.

A further means of providing hygienic support for the user's slacks in the lavatory stall may be provided by having a plurality of peelable anti-microbial cover sheet layers 350 stacked on a top surface of the arm 312 or, where a sleeve is utilized, the cover-sheet layers may be stacked on a top surface of the sleeve 313 (FIGS. 7 and 9). The cover sheet layers 350 may be stacked on a cardboard backing 351 that may be used to releasably secure the layers to the arm/sleeve, using a securing flange/member 313SM thereon, as seen in FIG. 12. The securing member 313SM may crimp a portion of the cardboard to releasably retain it thereon. Alternatively, adhesive or another securing means may be used to secure the stack of cover sheet layers. As a person enters the stall and moves the slacks valet mechanism 310 into the deployed position, the user of the device my peel off the uppermost cover sheet layer and dispose of it in the toilet, to thereby expose a hygienic cover layer onto which he/she may lower his/her slacks.

FIG. 16 also shows a strap 360 that may have snap 361 on each end. The strap may wrap around the housing 320 to have the snaps be secured to a corresponding snap member 362 that is fixedly secured on the housing. The strap 360 may be used as a backup means of maintaining the mechanism in the stowed position, particularly for its transport. The strap may be stored on the housing by an extra corresponding male/female snap member 362 located on the housing 320.

Figure 17:
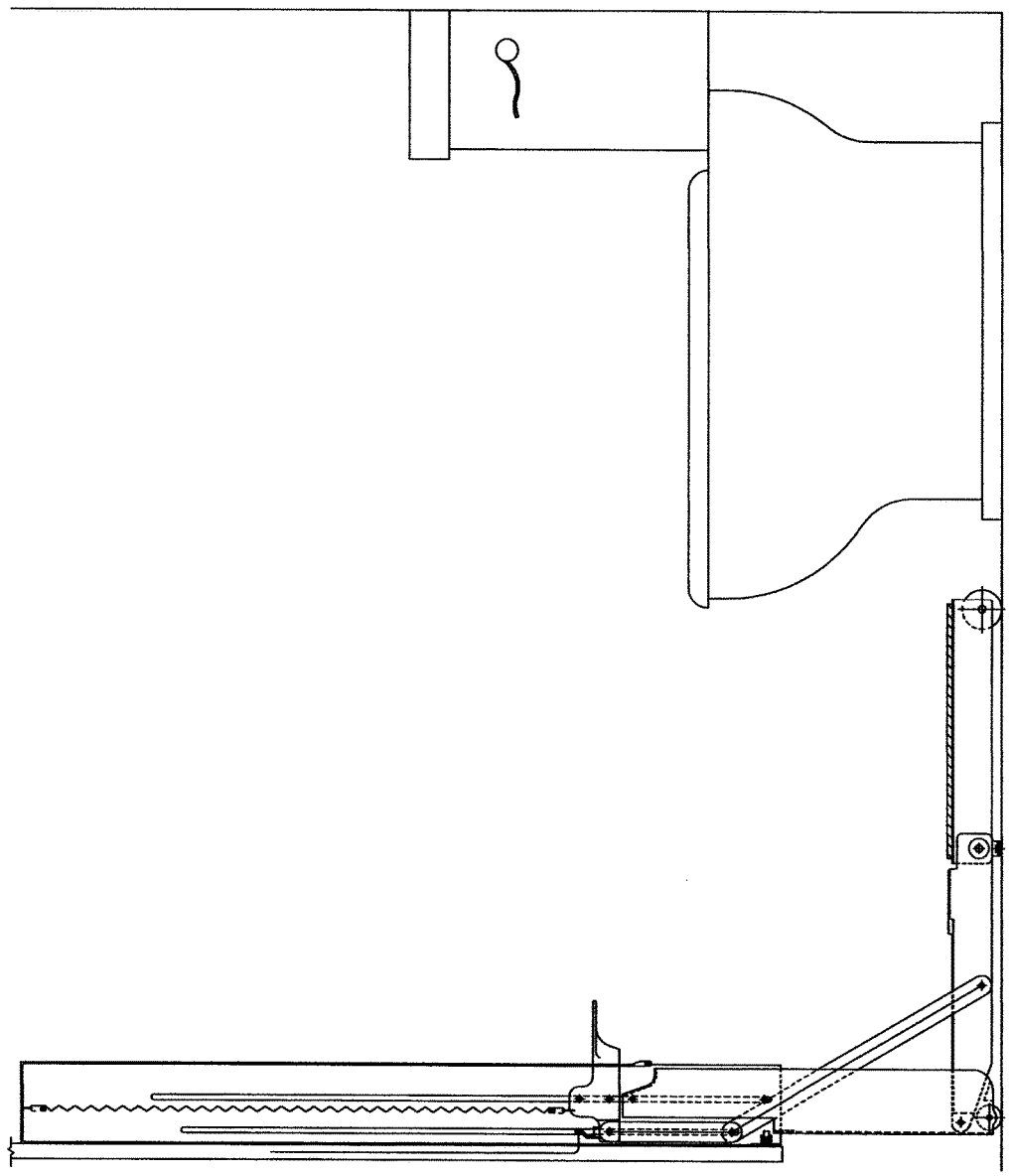
FIG. 17 is an enlarged side view of a public restroom stall, with a toilet therein, and with a fourth embodiment of the slacks valet mechanism of the current invention installed on the stall door, and being shown in the deployed position.
Figure 22A:
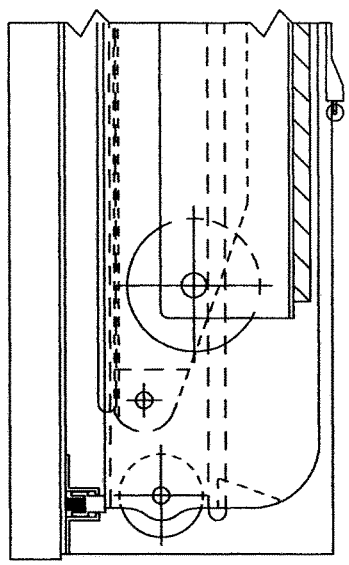
FIG. 22A is an enlarged detail view of the spring biased stop pin for releasably inhibiting vertical travel of the arm holder of FIG. 22, shown with a flange of the arm holder depressing the pin, after having been contacted and depressed by the first arm, which permitted the arm holder to translate upward into the stowed position.

Other utility may be provided by a fourth embodiment of the slacks valet mechanism of the current invention, which is shown in the extended position in FIG. 17. Slacks valet mechanism 410 may provide different motion, in that its arms may generally deploy downward and outward from a housing, through translational and pivotal movements, to conveniently become positioned between the user's legs, by the simple downward actuation of a handle.

As seen in FIGS. 17 and 18, the slacks valet mechanism 410 may also be positioned on a lower portion of the stall door 15, and may be secured thereto using fasteners to attach the housing 420 to the stall door. For slacks valet mechanism 410, the housing 420 may include, or may itself form, a track to provide for the motion of an arm holder 425 that may be slidably installed therein.

The arm holder 425 may generally have a channel-shaped cross-section (a base with two side flanges extending from each end of the base), into which may nest a first arm 411 and a second arm 412. Each of the side flanges of the channel-shaped arm holder 425 may have a pair of pins (426A/426B and 427A/427B) protruding outwardly therefrom, which may be respectively received in the slotted openings 421A/421B on opposite sides of the housing. Although the slotted openings 421A/421B that form the track may formed to be in the outer wall of the housing, it may be preferable that they instead be located in an interior wall or in a separate track member, so as not to be visible from within the stall, and to also thereby not be susceptible to foreign objects being lodged therein, which might cause jamming of the mechanism or soiling of the arms. The arm holder 425 may thus be able to translate relative to the housing—into its cavity or out therefrom—by its pins 426A/426B and 427A/427B tracking within the slotted openings 421A/421B.

The first arm 411 may be pivotally attached to the arm holder 425 in any suitable manner, including, for example, using a pin 411P that may secure a tongue portion 411T of the first arm to the side flanges of the arm holder at its first end. The first arm 411 may also generally have a channel-shaped cross-section, other than the tongue 411T at its first end. The second end of the first arm 411 may be configured for attachment of the second arm 412. The channel-shaped cross-section of the first arm 411 may transition to having just the pair of side flanges 411i and 411ii extending from its second end, as seen in FIGS. 18 and 18A, into which the first end of the second arm 412 may be pivotally mounted.

The second arm 412 may be formed with any cross-sectional shape that could nest within the interior of the channel of first arm 411, and could therefore be just a rectangular block. However, for reducing its weight and satisfying other design considerations, the second arm 412 may also have a channel-shaped cross-section. The second end of arm 412 may have a wheel 445 be rotatably mounted within the channel using pin 443, so as to protrude slightly therefrom-protruding out somewhat from the bottom of the channel, and protruding outward somewhat from the end of the arm, the significance of which is discussed hereinafter with respect to the deployment of the mechanism. (Note, rather than a wheel, a spherical ball bearing may alternatively be used). The first end of the second arm 412 may be pivotally attached to the pair of side flanges 411i and 411ii of the second end of the first arm 411 using pin 442. The pins 442 and 443 may each be a simple bolt and nut combination, or they may each be a bucked rivet-type fastener. However, to reduce the height of the pin to better enable nesting as described hereinafter, the pins 442 and 443 may each have a shallow height shear-head on each side, and they may also be a two-piece pin arrangement, one of which may be threadably received into the other (e.g., pins 442A/442B and 443A/443B seen in the cross-sectional views of FIGS. 18A and 18B).

Since the wheel 445 may protrude out from the bottom of the channel of second arm 412, thereby elevating it slightly off of the floor 10 of the lavatory stall, a means of support for the pivotable connection between the first arm 411 and the second arm 412 may be provided, so that both arms may be similarly elevated at the same height above the floor at that location. The means of support may be another wheel being rotatably mounted thereat, or the means of support may simply be the channel section of the second arm 412 transitioning locally into a hollow rectangular cross-sectional shape, as seen in FIG. 18A. The bottom of that rectangular cross-sectional shape may be fitted with a plastic or rubber grommet 447 to lessen the abruptness of contact of the arms of the mechanism with the floor. Instead of, or in addition to, the grommet, a spring may be used to cushion contact therebetween. Also, the second arm 412 may be biased in relation to the first arm 411 by a torsion spring mounted at the pivotal connection therebetween, so that the arms would normally seek to occupy the angled (partially nested) position seen in FIG. 18 (arms 411U and 412U), rather than the deployed, in-line position (arms 411 and 412) or the completely nested position when the mechanism is stowed within the housing. Thus, the biasing force would naturally serve to counter the tendency toward abrupt contact between the grommet/arms and the floor.

The top of the second arm 412 may have a means of providing hygienic support for the user's slacks in the lavatory stall, such as the stacked plurality of peelable anti-microbial cover sheet layers 450 shown in FIG. 18, that were discussed previously.

The arm holder 425 may directly contact the floor 10, or a grommet may instead be used to cushion such contact therebetween, or a wheel 446 (or a spherical bearing) may be rotatably secured to the bottom of the arm holder using a pin 444, to be capable of providing rolling contact with the floor.

Figure 22:
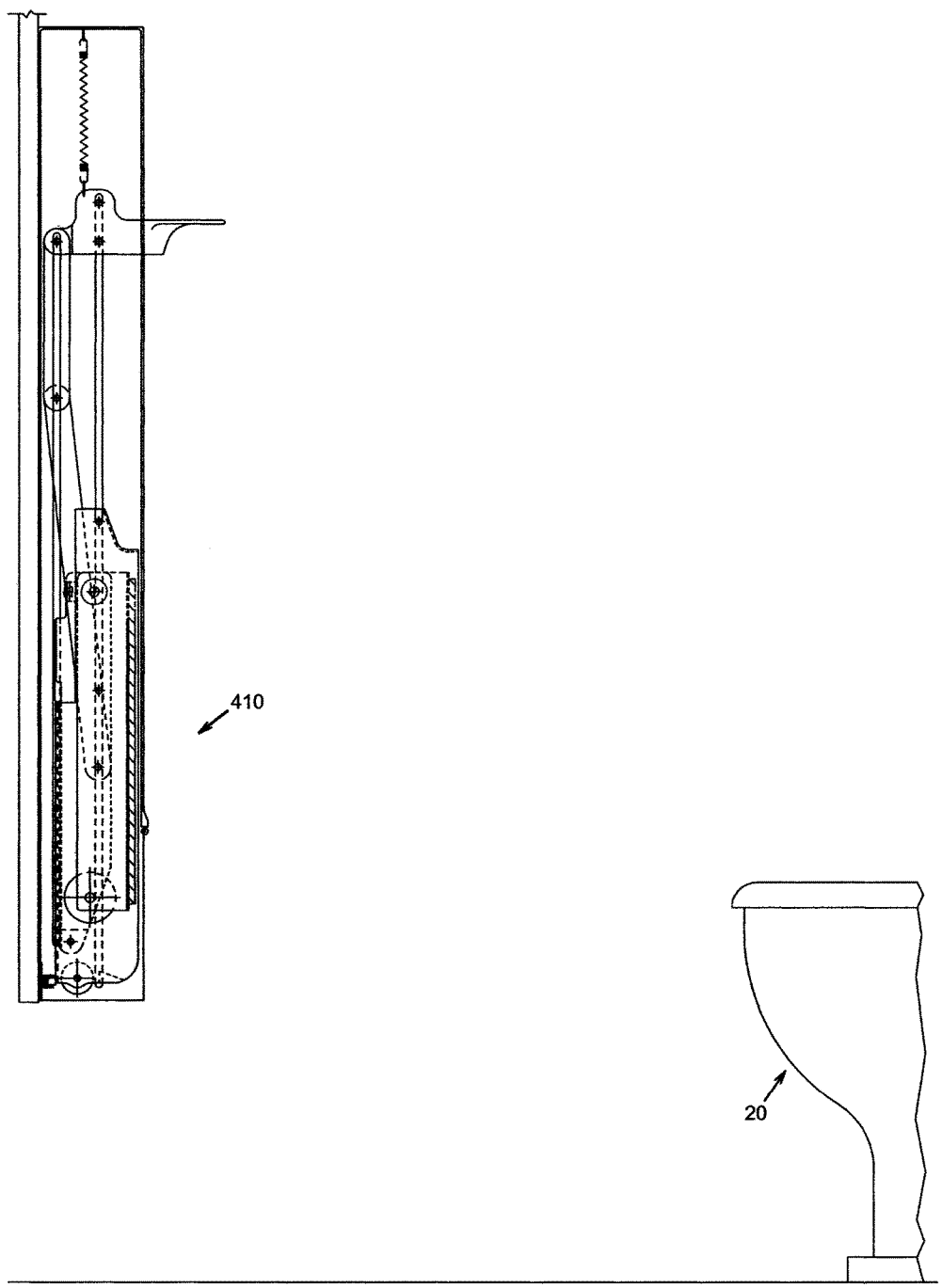
FIG. 22 is the slacks valet mechanism of FIG. 21, but shown with second arm section fully pivoted to be nested within the first arm section, and with both arm sections and the arm holder having been translated to be stowed within the housing.

The slacks valet mechanism 410 seen in FIG. 18 serves to illustrate its handle-driven manual deployment from the stowed position (FIG. 22), to the deployed position (FIG. 17). A pair of support arms 430A/430B may each have one end be pivotally connected to the first arm 411, and may each have the other end be pivotally coupled to the connecting link 432. The connecting link 432 may have a pair of pins protruding outwardly that may slidably engage in slotted openings 431A/431B that are formed similar to the slotted openings 421A/421B that slidably accommodate pins 426A/426B and 427A/427B for the tracking of the arm holder 425. The upper end of the connecting link 432 may have a pivotal connection with the handle 435, which itself may have pins 436A/436B and 437A/437B protruding outwardly to be received within the slotted openings 421A/421B to track therein. Note that alternative arrangements for the handle and connecting link are possible, which may serve to eliminate at least one of those pin sets, and moreover, the connecting link 432 and the handle 435 could even be formed as a single part.

Figure 21:
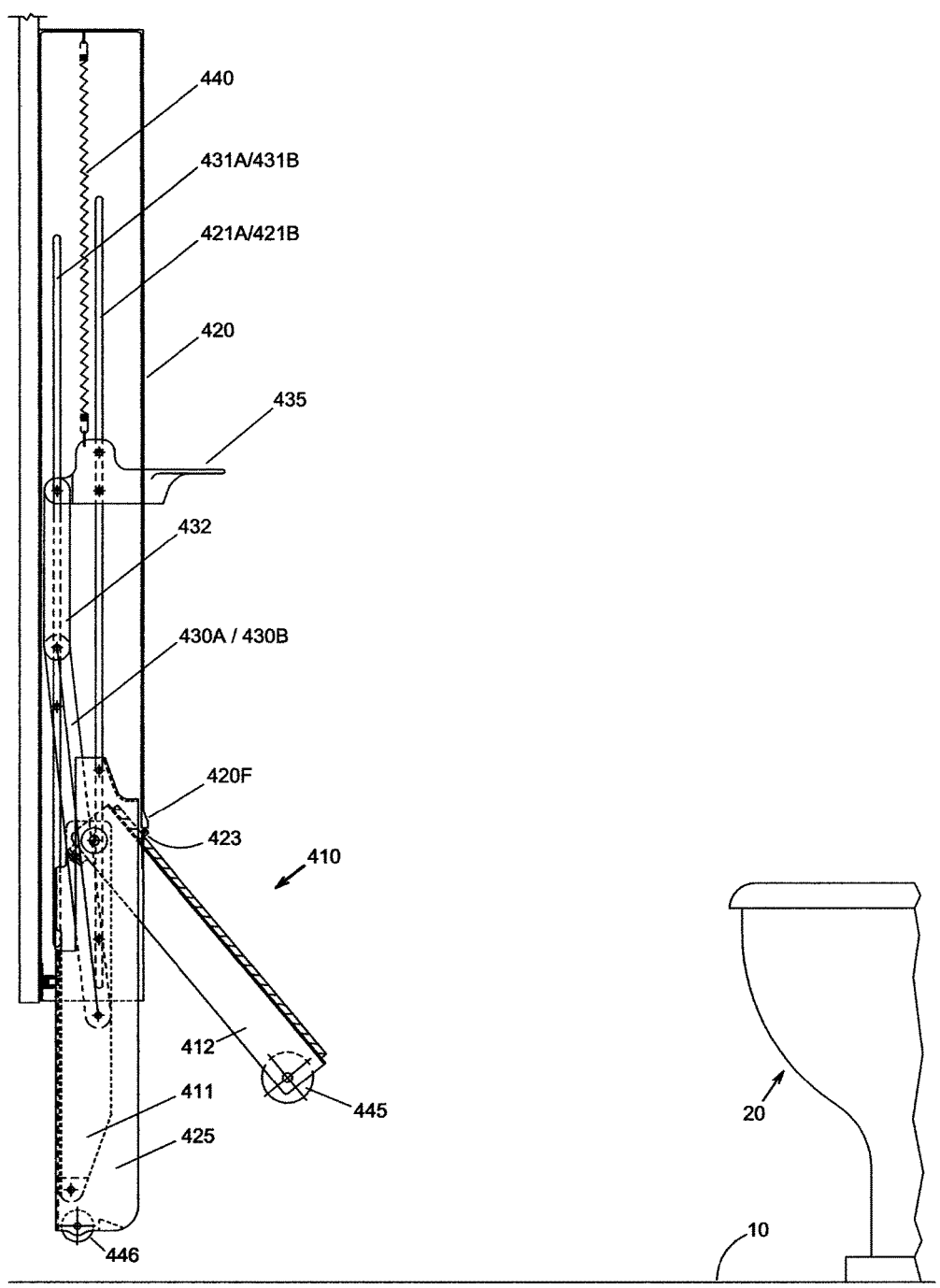
FIG. 21 is the slacks valet mechanism of FIG. 20, but shown with the first and second arm sections and the roller of the arm holder having translated vertically, so that the outwardly biased second arm section is contacting the housing roller that serves to counter the outward biasing of the second arm section to cause pivoting of the second arm section, for it to become nested within the first arm section.

As the handle 435 is manually actuated towards the floor by the user to move the device into the deployed position, such handle actuation may release a catch that holds the mechanism in the stowed position, and the downward handle motion may thereafter cause the connecting link 432 to drive the support arms 430A/430B, which in turn drive the first arm 411 and second arm 412 downward, which thereby drives the arm holder 425 downward. Downward travel of the arm holder 425 would be terminated upon contact of the wheel 446 with the floor 10. Once the pivotally connected ends of the first arm 411 and second arm 412 reach the opening in the bottom of the front wall 420F of the housing 420 (see FIG. 21), they are free to be driven by movement of the handle 435 towards their final position in the deployed mechanism state, which may be synchronized to happen just as the wheel 446 of the arm holder 425 is about to contact the floor 10. The aforementioned biasing of the second arm 412 with respect to the first arm 411 may also serve to "spring" the second arm out from its nested position within the first arm, which may in turn tend to pull the first arm 411 out from its nested position within the arm holder 425. In addition to this outward springing of the first and second arms, or in lieu of such biasing, the eccentric alignment of the support arms 430A/430B with respect to the positioning of the first and second arms, when in the stowed or partially stowed position (see FIG. 21), may serve to drive the first and second arms outwardly.

As the second arm 412 reaches its unbiased position with respect to the first arm 411, designated as arm 412U within FIG. 18, the weight of the second arm and the driving motion from the handle, through connecting link 432 and the support arms 427A/427B, may cause the first arm to continue pivoting downward, such that the wheel 445 of the second arm may initially contact the floor 10 and begin rolling thereon. Continued downward actuation of the handle 435 by the user may thereafter overcome the biasing of the torsion spring, which would tend to restrain any further parting of the arms, to cause further pivoting and separation of the first and second arms until the grommet 447 comes into contact with the floor 10.

Retraction of the first and second arms 411 and 412 into the stowed position may be achieved by upward actuation of the handle 435 by the user. The arm holder 425 may be weighted to be slightly greater than the vertical component of force that is required to initially raise the first and second arms 411 and 412, by the force applied from support arms 430A/430B. Being so balanced, the first and second arms may be driven to retract and be nested within each other and within the arm holder, without the arm holder prematurely translating vertically, which could result in the first arm 411 being hung up outside of the housing front wall 420F and thereby obstructing proper sequenced movement of the mechanism into the stowed position.

Figure 20A:
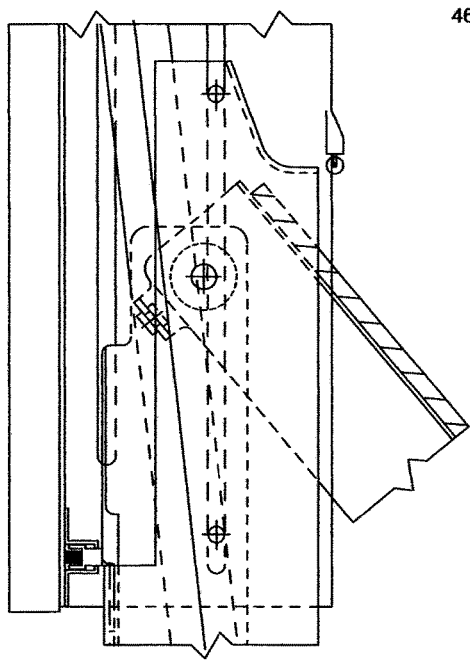
FIG. 20A is an enlarged detail view FIG. 20, shown with the first arm having been retracted to nest within the arm holder and depress the stop pin, to permit the arm holder to subsequently translate upward into the stowed position.
Figure 20:
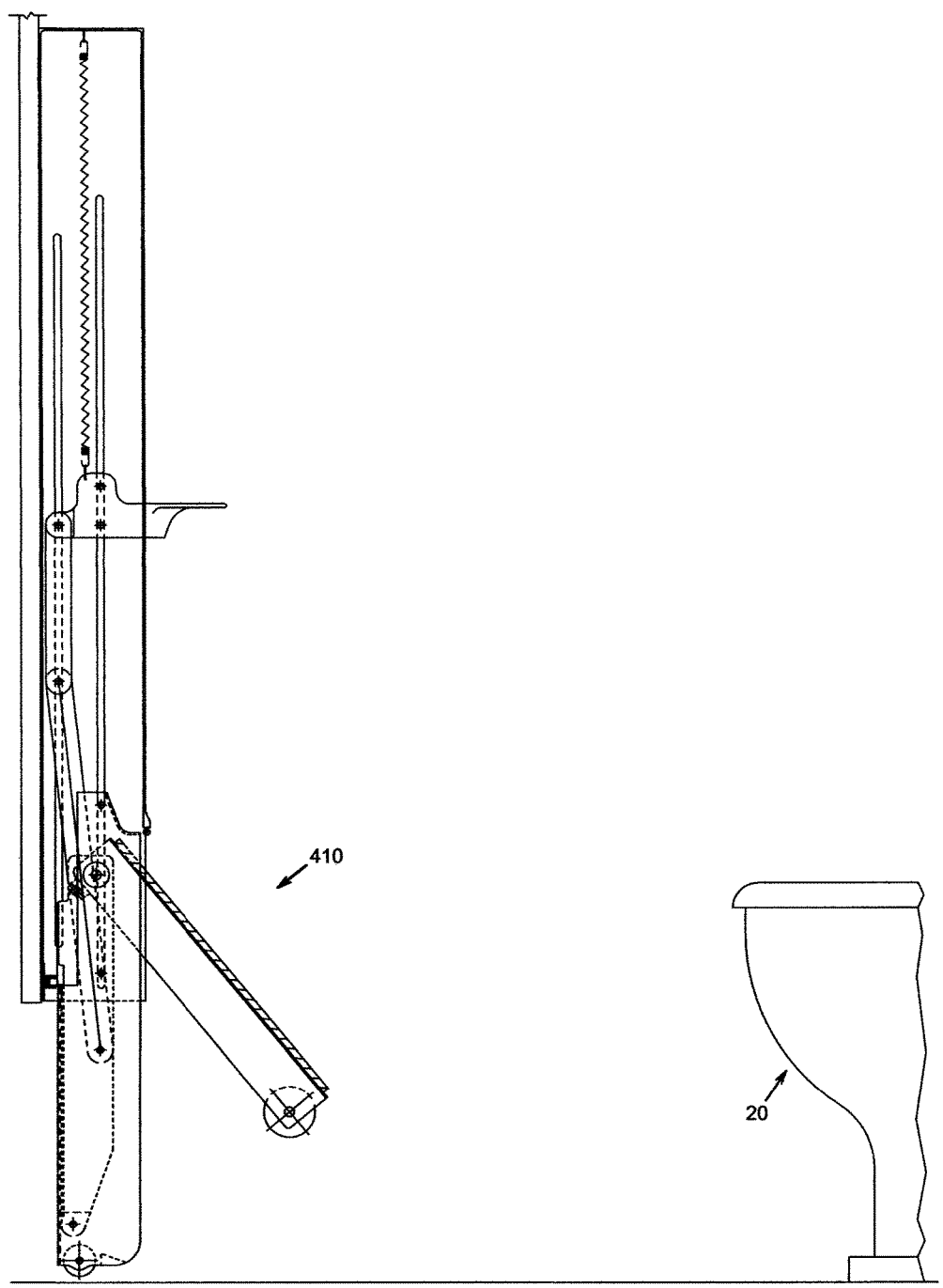
FIG. 20 is the slacks valet mechanism of FIG. 19, but shown with the first arm section having completed its pivotal movement in preparation for translation into the stowed position, with the second arm section in its normally biased outwardly angled position with respect to the first arm section, and with the first and second arm sections and the roller of the arm holder having translated vertically to just be clear of the floor.

To further assure proper sequencing of the retraction and nesting of the first and second arms 411 and 412 within each other and within arm holder 425, to occur prior to upward translation of the arm holder, and without also having to add weight unnecessarily to the arm holder, a stop pin 460 may be spring biased to releasably inhibit the vertical movement of the arm holder. As the user actuates the handle 435 upwardly, which may tend to also raise the arm holder 425 in addition to the first and second arms 411 and 412, a flange of the arm holder will contact the pin 460 and thereby temporarily restrain the arm holder from upward movement (see Figured 18C), so that the first and second arms can become partially nested within each other and within the arm holder, without having the first arm being caught upon the front housing wall 420F. As the first and second arms become properly nested, a flange of the first arm will depress the pin 460 (FIGS. 20 and 20A), thereafter permitting the sequenced upward travel of the arm holder with the nested first and second arms therein. The outwardly biased second arm 412 may contact a roller 423 that is rotatably attached in the opening at the end of the front housing wall 420F (FIG. 21), which works to overcome the biasing, and to urge the second arm to further nest within the first arm, as the arm holder rises, until reaching the stowed position (FIG. 22), where it may be maintained by a catch that may be releasably coupled to the handle.

Figure 18C:
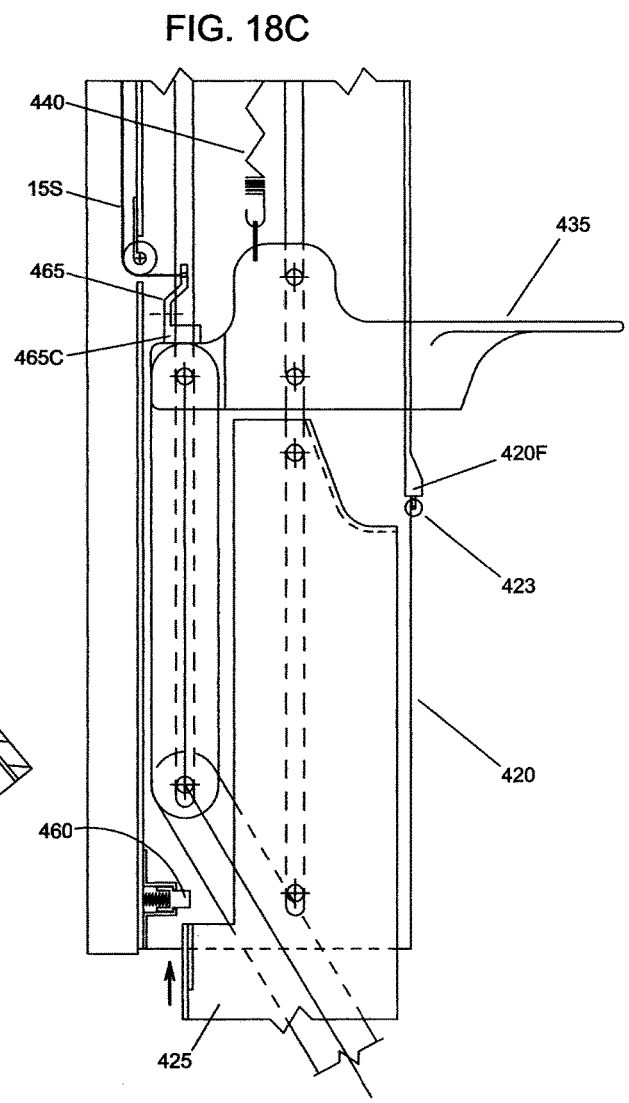
FIG. 18C is an enlarged detail view of the spring biased stop pin for releasably inhibiting vertical travel of the arm holder of FIG. 18, shown with the arm holder displaced downward from the pin, prior to being elevated into contact with the outwardly biased pin.
Figure 19:
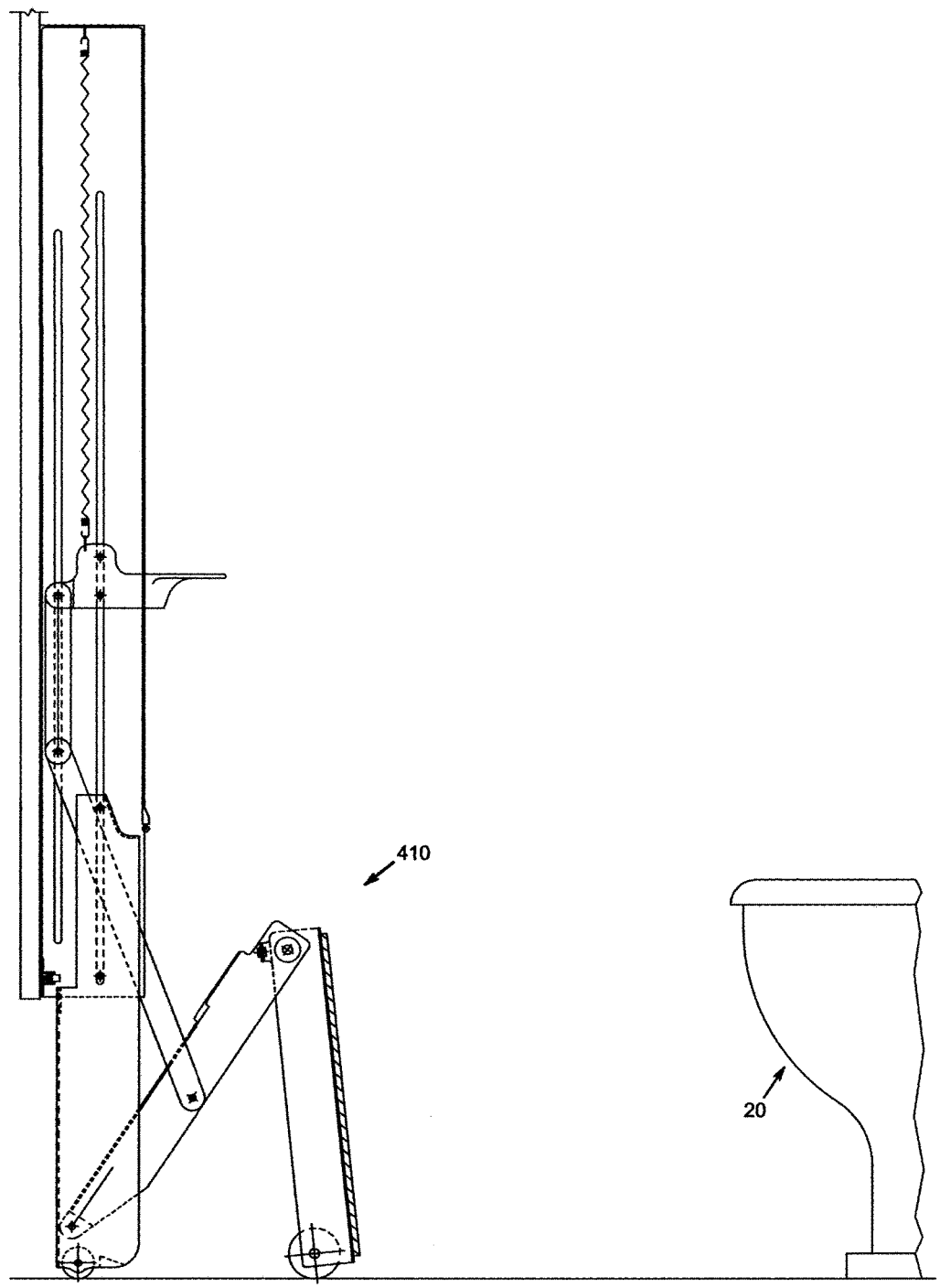
FIG. 19 is the slacks valet mechanism of FIG. 18, but only showing the first and second arm sections initially being retracted to prepare the mechanism for its translation into the stowed position.

Another improvement may be made to the slacks valet mechanism 410 to make its retraction into the stowed position be fully automatic, by the push of a button. A spring 440 may be used to upwardly bias the handle and to maintain the mechanism thereat instead of the catch securing the handle. A rocker arm 465, as seen in FIG. 18C, may be actuated to pivot by the touch of a button that is exposed through a hole in housing 420, which may release a catch portion 465C of the rocker arm that may otherwise restrain the upwardly biased movement of the handle. Once the catch portion 465C of the rocker arm 465 is displaced to release the handle 435, the spring biasing may actuate the handle 435 in the same manner as previously described for the upward manual actuation by the user. During the downward manual actuation of the handle 435 by the user, the handle may contact the catch portion 465C and cause the rocker arm 465 to pivot, and temporarily displace the catch from it path of travel. The rocker arm 465 may be biasing by a spring back to its normal position so that the catch portion 465C may again releasably inhibit the handle against upward travel, until the release button has been pushed. It should be noted that when the catch 465C of the rocker arm 465 restrains the upward movement of the handle, and consequently the mechanism, there should be a small gap between the flange of the arm holder 425 and the biased stop pin 460 (see FIG. 18C), to again assure proper functioning of this automatic retraction sequence. During the manual downward deployment of the mechanism, if the flange of the arm holder 435 were to release the stop pin 460 after the handle had moved past the catch 465C of the rocker arm 465, then the upward biasing of the spring 440 would be inhibited by the stop pin 460 and not the catch 465C, so toggling the button to move the rocker arm could not effectuate retraction of the mechanism. The user would need to manually retract the handle 425 until the flange on the first arm 411 depressed the pin 460 (i.e., manually causing retraction and nesting of the first and second arms within the arm holder), to thereafter enable upward biasing, by spring 440, of the first and second arms and the arm holder.

Figure 23:
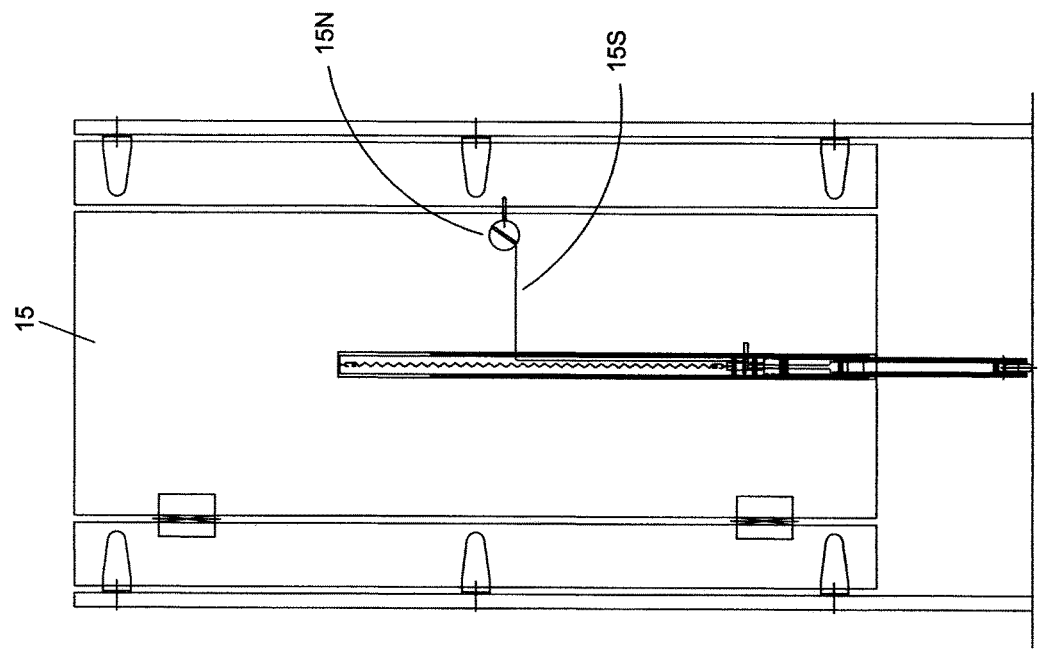
FIG. 23 is the slacks valet mechanism of FIG. 17, but shown with a lavatory stall door that is outfitted with a wired connection between the knob of the stall door latch, and a catch of the slacks valet mechanism, which may thereby be triggered to cause automatic retraction of the arm sections and arm holder back into the housing, to be in the stowed position.
Figure 24:
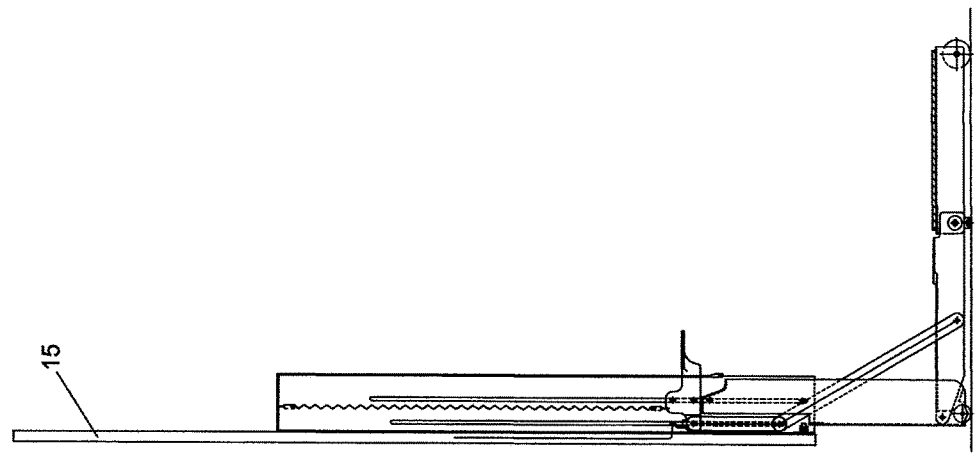
FIG. 24 is a front view of a lavatory stall door and slacks valet mechanism of FIG. 23.
Figure 25:
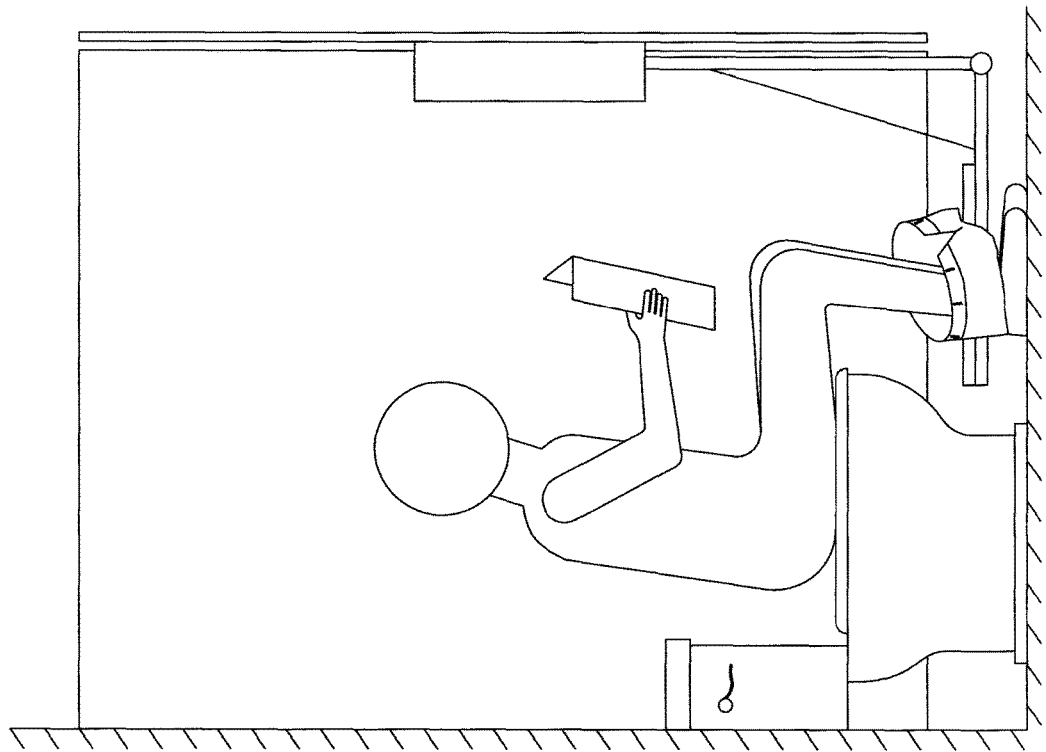
FIG. 25 shows a side view of a user seated upon a toilet, and with the user's lowered slacks being draped upon the arm of the slacks valet device shown therein, being thereby protected from contact with the restroom floor.
Figure 26:
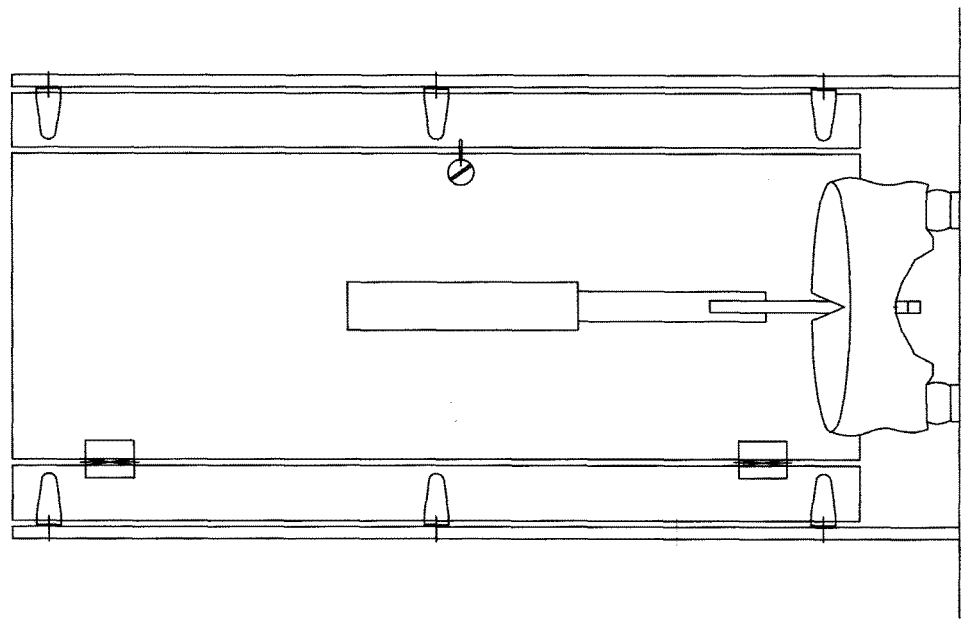
FIG. 26 is a front view of the user's slacks lowered upon the slacks valet device of FIG. 25.
Figure 27:
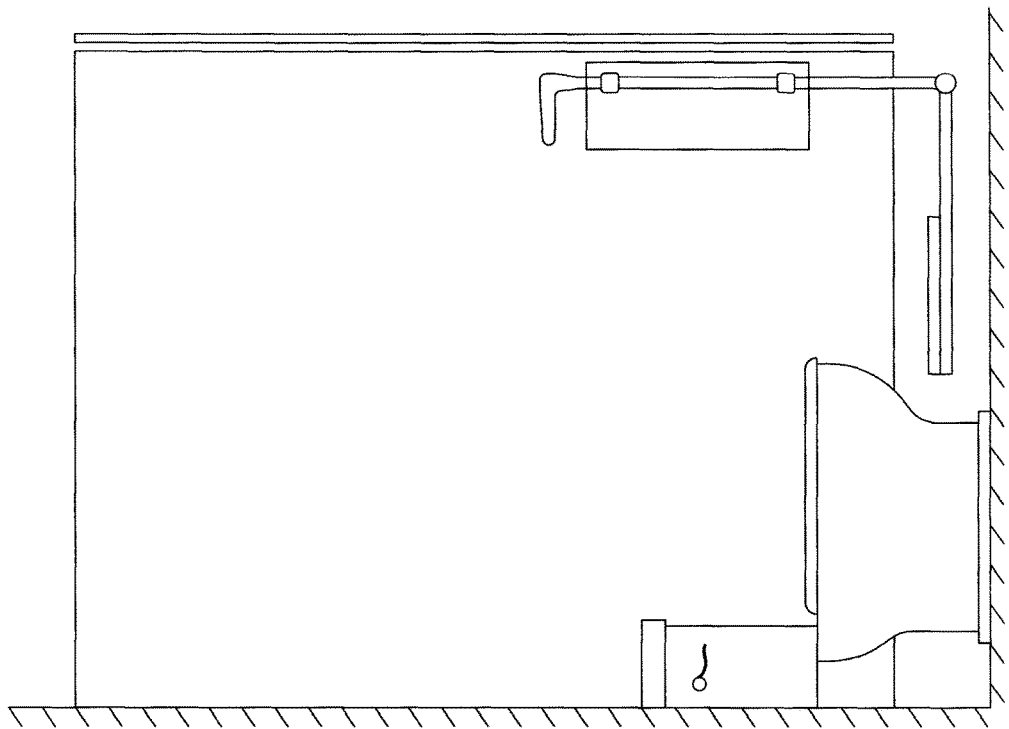
FIG. 27 a side view of a public restroom stall, which has an embodiment of the slacks valet of the present invention installed therein, in which the device is mounted to the wall of the stall, or which may be mounted to the wall of a restroom which does not have a conventional stall.
Figure 28:
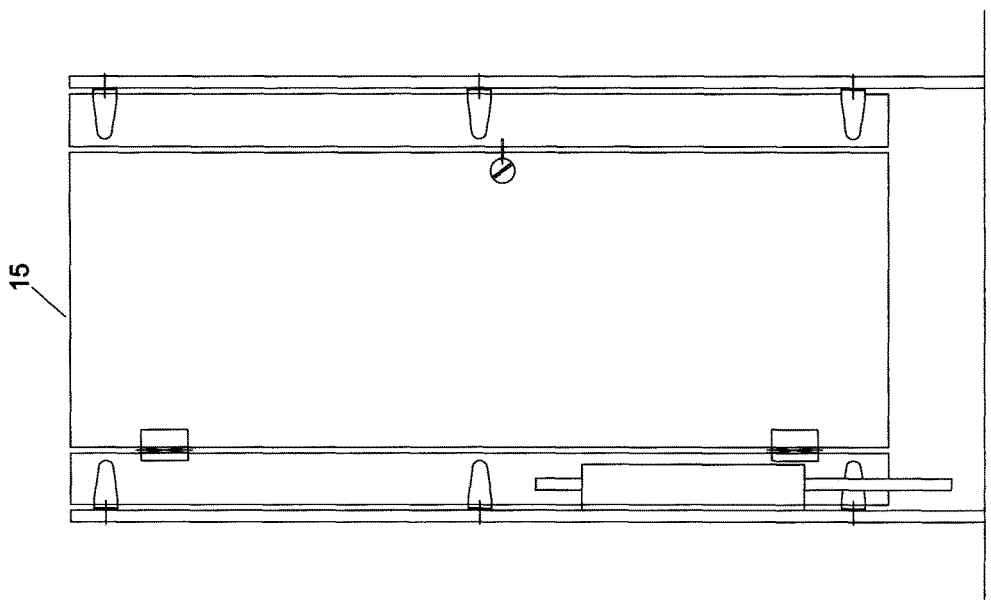
FIG. 28 is a view looking at the inside of the door of the stall in FIG. 27, with the slacks valet device mounted to a side wall of the stall.

Another improvement may be made to the slacks valet mechanism 410 to make its retraction into the stowed position be fully automatic, even in the instance where the user may attempt to egress from the stall, prior to either manually retracting the mechanism or manually triggering automatic retraction using the push button. As seen in FIGS. 23 and 24, the twistable door knob of the stall door 15 may initially be outfitted (or may later be retrofitted) with a special knob 15N that may provide a connection with the catch portion 465C of the rocker arm 465, which may include, but is not limited to, a steel cable 15S. One end of the cable 15S may attach to a flange of the knob 15N, and the other end of the cable may be fixedly secured to the rocker arm 465 (FIG. 18C). The necessary turns in the cable 15S may be accommodated by pulleys, sectors, or quadrants, to prevent the cable from hanging up, such as the pulley located on the edge of the opening in the door 15, through which the cable must pass to reach the rocker arm 465. This arrangement of the knob 15N with cable 15S for the slacks valet mechanism 410 enables automatic retraction of the device, and prevention of damage thereto, in the case where a user attempts to exit the stall without first retracting the device, because as the user turns the knob 15N to unlock and open the stall door 15, the cable 15S will trigger the catch portion 465C of rocker arm 465 and cause automatic retraction as described previously, and prevent the device from impinging on another user within an adjacent stall, or from impinging on other lavatory stall structure.

Figure 29:
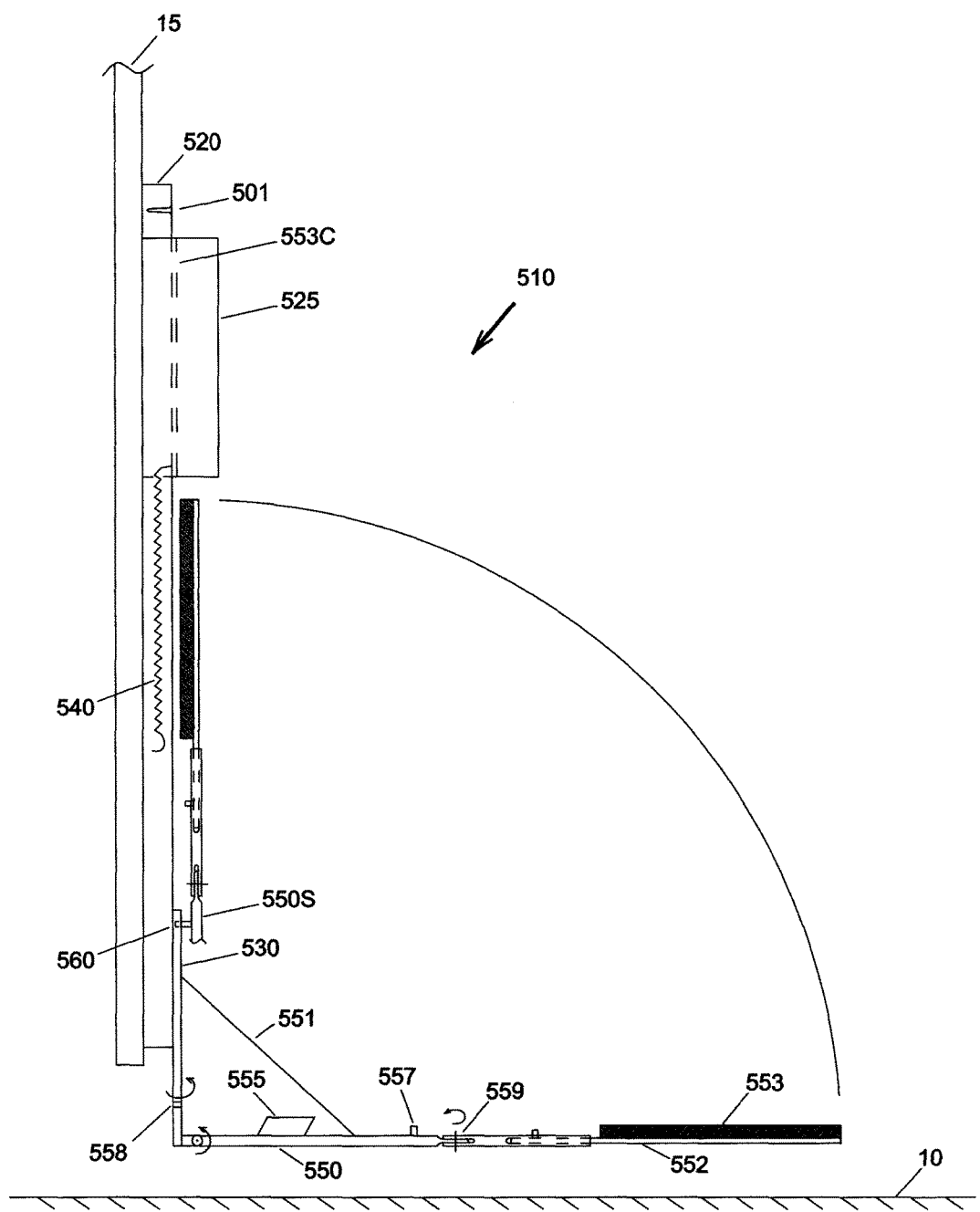
FIG. 29 is a side view of the embodiment of the door-mounted slacks valets device shown generally in FIG. 25.

The lavatory stall slacks valet 510 of FIG. 29 includes a housing 520, which may be secured to the door 15 of the stall using screws 501 or other mechanical fasteners. The housing 520 may provide a track for the motion of the slider support member 530 that may be slidably installed therein. The slider support member 530 may be biased by a helical spring 540 towards the top of the door to generally be in the non-deployed or stowed position. At the bottom, of the slider support member 530 may be support arm 550.

Support arm 550 may be pivotally attached to the bottom of the slider support member 530, to be moveable between the deployed or extended position, where the arm is generally parallel to the floor of the stall, but displaced therefrom by approximately 1 to 10 inches, and the retracted position (arm 550S), where the arm is generally perpendicular to the floor, and may be contacting the slider support member 530. Downward rotation of the support arm 550 may be limited by stops at the pivotal connection, and/or by the tension member 551. Support arm 550 may have, at an end distal from the door, an adjustable member 552 that is slidably connected with the support arm 550. There may be a detent that secures the adjustable member 552 at any desirable position relative to the stall door, to be at an optimum distance from the toilet. The adjustable member 552 may preferably have a clothing-friendly cloth covering 553 secured thereon, for contact with the crotch of the user's slacks. Alternatively, or in addition, a hygienic peelable stack of disposable cover sheets may be secured thereon, so that a next user of the device may peel off the old cover to be assured of having a clean surface (the next lower peelable layer) to rest his/her slacks upon.

A handle may allow the user to slide the slider support member 530/support arm 550 combination downward into position, where a mechanical catch 560 on the support member 530 may engage a corresponding feature on the housing track 520 to oppose the spring biasing, when the arm is correctly positioned. As the slider support member 530/support arm 550 moves downward as a result of the user actuating the handle, the support arm 550 may exit from the protective shroud 525, and may gravity free-fall to the horizontal position. This motion may be slowed by the use of a damper so that the arm does not strike the floor. The tension member 551 may comprise two members, one being flexible but generally inelastic in the axial direction, and a second member that is elastically deformable and which may shorter, so as to require some deflection of the second member caused by the arm, for the arm to reach the horizontal position, deflection that may occur as a result of the weight of the arm.

Retraction of the support arm 550 may be by the user grasping it by his/her hand to raise it up, or a foot pedal 555 may be secured to the arm so that the user may use his/her foot to raise up the arm. Once the arm reaches the vertical position, a protrusion 557 may engage and release the catch 560, so that the slider support member 530/support arm 550 combination will then be biased vertically by spring 540, with the cloth covering 553 of the adjustable member 552 translating upward to be within the shroud. The cloth covering 553 may contact a corresponding cloth member 553C secured therein, which may serve as a wiper to clean any dirt or lint from the cloth 553 that is to contact the user's slacks. Use of the peelable hygienic layers may obviate the need for the wiper.

To help protect the user of the stall from accidentally tripping, by inadvertently trying to egress from the stall before retracting the device, the bottom of the support member 530 may have a center biased pivotal connection 558, and a central portion of the support arm 550 may also contain a centrally biased pivotal connection 559. This biasing may be provided by one of several different means, including a torsion spring. So, if the user moves his foot and leg, and contacts the arm 550, it may pivot at two different locations to generally yield to the user's movements, and not be a stiff obstacle that could cause him/her to lose his balance within the stall. A placard may also become visible when the arm is deployed, so that as the user reaches to raise his/her slacks, a warning may be visibly provided to the user to remind him/her to raise the arm before attempting to egress from the stall, to further prevent an accident.

Figure 30:
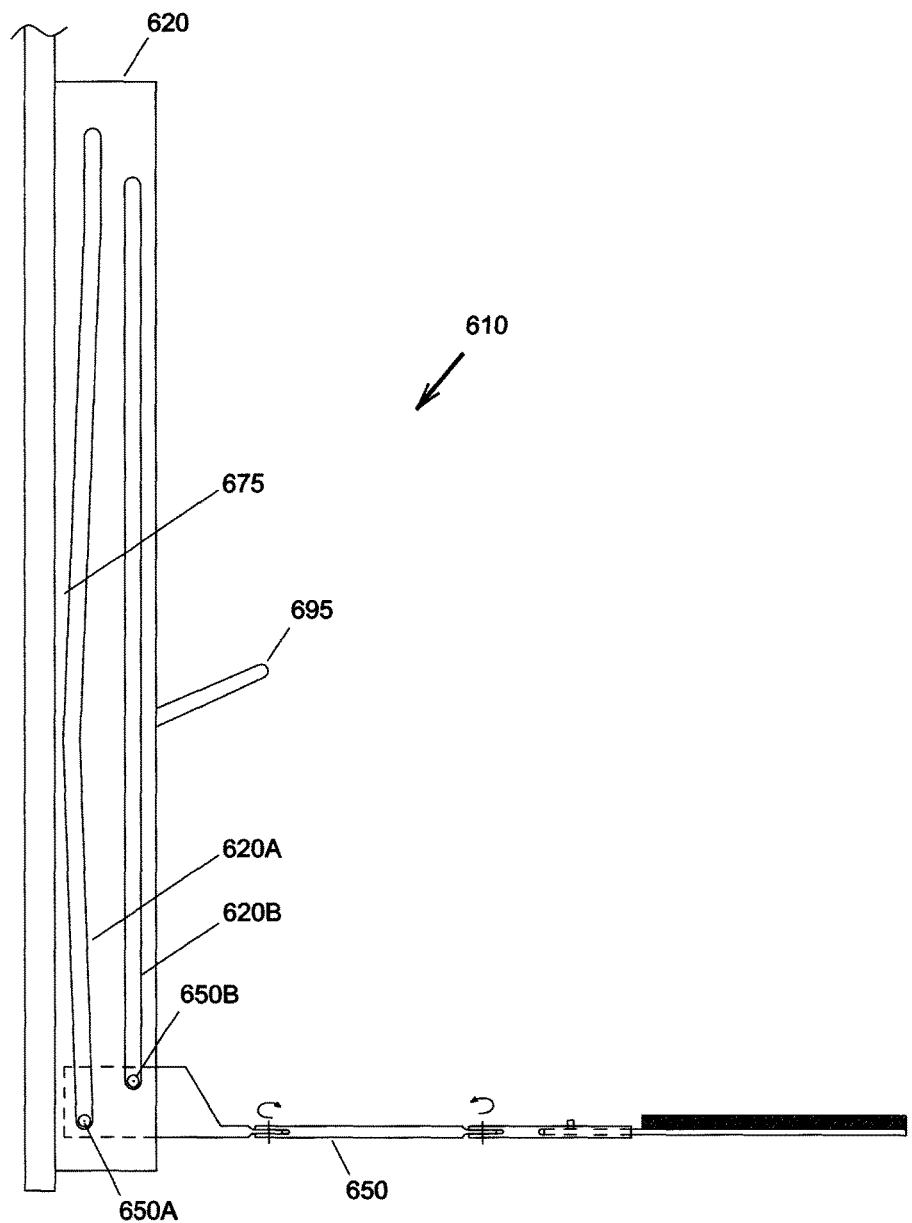
FIG. 30 is a side view of another embodiment of the slack valets device of the present invention, with the device shown in the deployed position.
Figure 31:
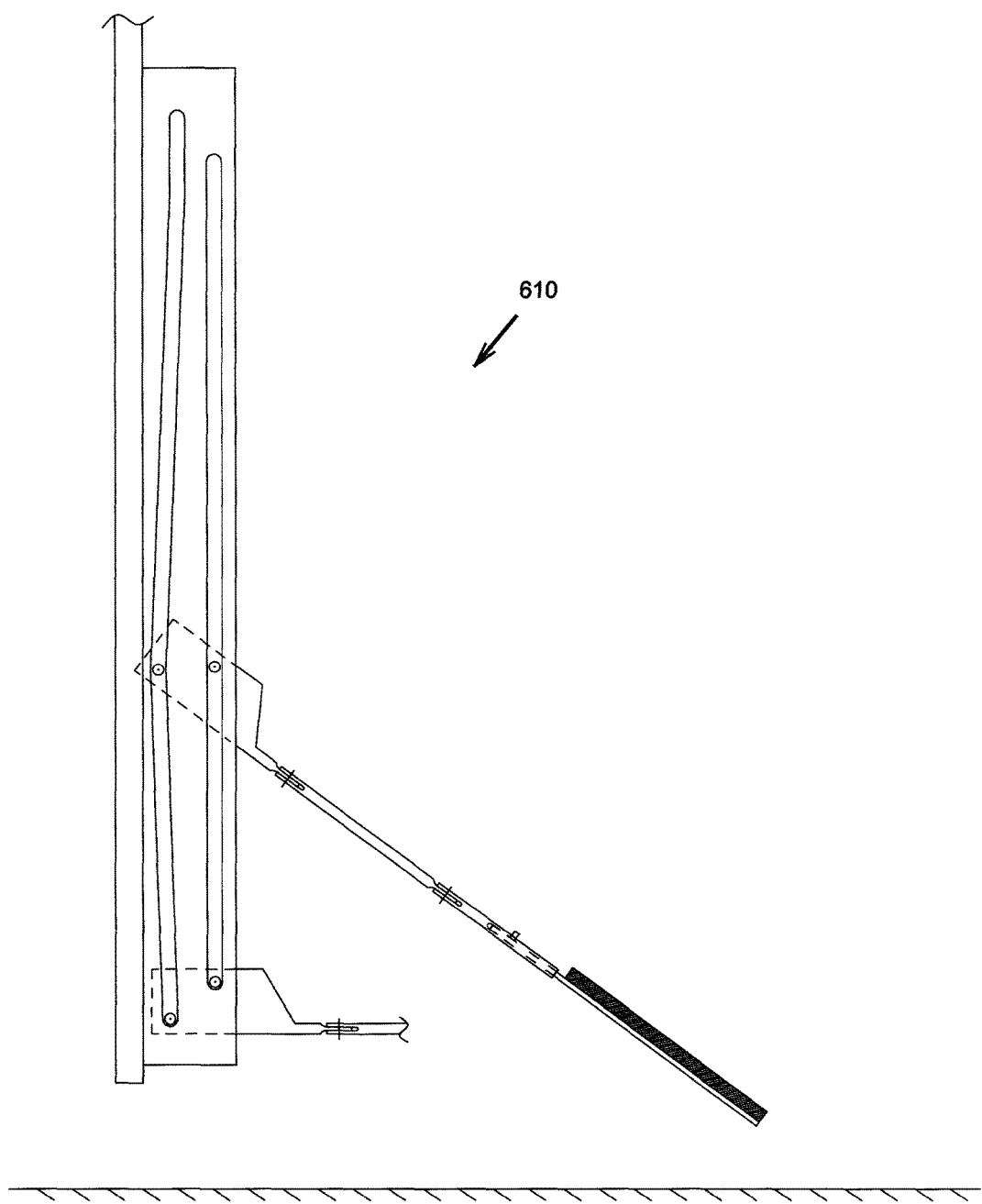
FIG. 31 is the side view of the device of FIG. 30, but with the arm of the device shown in the process of being moved by the user between the stowed and deployed positions.
Figure 32:
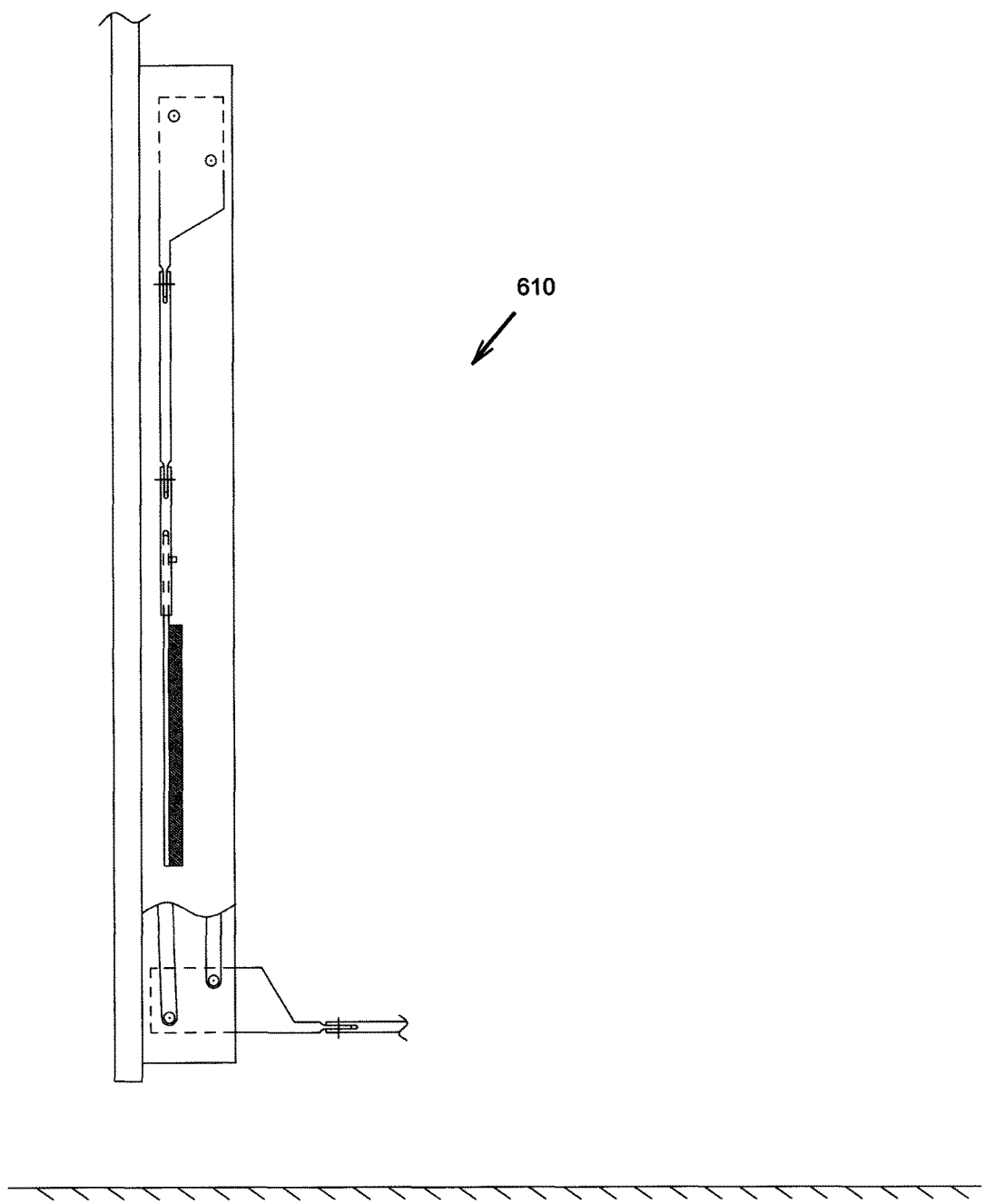
FIG. 32 is the side view of the device of FIG. 30, but with the arm of the device shown in the stowed position.

A lavatory stall slack valet 610 is shown in FIG. 30. Slack valet 610 provides different motion, in which the arm deploys generally downward, and then also rotates to become positioned between the user's legs. This motion may be provided by several different mechanical arrangements. In one such arrangement, a pair of pins, 650A and 650B, protruding from arm 650 may be received in separate tracks 620A and 620B of housing 620. A slider bar 675 within the housing may be connected to a handle 695. As the user raises the handle, the slider drives the arm 650 vertically, with the pins 620A and 620B tracking respectively in tracks 620A and 620B. The track 620B may be vertical, but the track 620A may strategically wander toward the track 620B, so that, as seen in FIG. 31, the arm's positioning begins to transition to have a downward angle during a mid-position between being stowed and fully-deployed. The stowed position is shown in FIG. 32. The track's curvature may thus be crafted so that during deployment, the arm gracefully drops down and then slowly angles in a scooping motion to be straddled by the user's legs, and does not need to come close to the user's torso during its movement, which may otherwise occur if only pivotal motion is used for the arm's motion.

The examples and descriptions provided herein merely illustrate certain embodiments of the present invention. Those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the preferred embodiment without departing from the spirit of this invention.

What is claimed is:

1. A slacks valet device, for preventing a pair of slacks worn by a user of a toilet in a lavatory stall from becoming soiled, once lowered, said device configured to provide support proximate to a crotch of the lowered slacks to prevent the slacks from hanging down, to prevent contact with a floor within the stall, said slacks valet device comprising:
   an arm, said arm having a first end and a second end;
   means for connecting said first end of said arm to a door of the stall for traveling between a stowed position and a deployed position; said stowed position comprising a position where at least a portion of said arm being distal from said first end is in proximity to the stall door, said arm comprising a length configured for said arm in said deployed position to comprise a position where at least a portion of said second end of said arm is distal from the stall door to be in proximity to the front of the toilet, and be positioned at a height being below a top surface of a seat of the toilet, with said length of said arm and said means for connecting configured for said at least a portion of said second end of said arm to move clear of the toilet between said deployed and stowed positions; said arm comprising a cross-sectional width configured to fit between the legs of the user while standing, with said device in said deployed position, to support the lowered slacks of the user to prevent contact with the floor; and
   stop means for substantially limiting said travel of said arm at said deployed position.

2. The slacks valet device according to claim 1 wherein said arm comprises a first arm section and a second arm section, said first arm section configured to be connected to the stall door using said means for connecting, and said stop means configured to limit its movement and said second arm section configured to be in said proximity to the toilet when said device is in said deployed position.

3. The slacks valet device according to claim 2 further comprising a joint in said arm configured to connect said first arm section with said second arm section.

4. The slacks valet device according to claim 1 further comprising a plurality of peelable anti-microbial cover sheet layers stacked on a top surface of said arm.

5. A slacks valet device, for preventing the slacks of a user of a toilet in a lavatory stall from becoming soiled, said device configured to provide support proximate to the crotch of the lowered slacks to prevent the slacks from hanging down, to prevent contact with the stall floor, said slacks valet device comprising:
   an arm, said arm having a first end and a second end, said first end of said arm pivotally coupled to a door of the stall;
   a stop;
   wherein said arm is configured to pivot between a stowed position and a deployed position, with said stop configured to engage a portion of said arm to substantially limit said pivotal movement of said arm to be at said deployed position;
   wherein said stowed position comprises a position where at least a portion of said arm being distal from said first end is in proximity to the stall door;
   wherein said arm comprises a length configured for said arm in said deployed position to comprise a position where at least a portion of said second end of said arm is distal from the stall door to be in proximity to the front of the toilet, and be positioned at a height being below a top surface of a seat of the toilet; said length of said arm further configured to permit said second end of said arm to rotate clear of the toilet to reach said deployed position; and
   wherein said arm comprises a cross-sectional width configured to fit between the legs of the user, while standing, to support the lowered slacks in said deployed position to prevent contact with the floor.

6. The slacks valet device according to claim 5 wherein said arm comprises a first arm section and a second arm section, said first arm section configured for said coupling with the stall door, and being movement limited by said stop, and said second arm section configured to be in said proximity to the toilet when said slacks valet device is in said deployed position.

7. The slacks valet device according to claim 6 wherein said second arm section is at an obtuse angle with respect to said first arm section; and wherein said angle is configured for said second arm section to be substantially parallel to the floor of the stall when in said deployed position.

8. The slacks valet device according to claim 5 further comprising slacks retaining means at said second end of said arm configured for preventing sliding of the lowered slacks off of said second end of said arm.

9. The slacks valet device according to claim 5 wherein said stop comprises a deformable member configured to deform a measured amount under a weight of said arm and of said arm being acted upon by the lowered slacks of the user.

10. The slacks valet device according to claim 5 further comprising a plurality of peelable anti-microbial cover sheet layers stacked on a top surface of said arm.

11. The slacks valet device according to claim 5 further comprising means for securing said arm in said stowed position.

12. The slacks valet device according to claim 5,
   wherein said means for connecting said first end of said arm to the stall door is further configured to support said arm, in said deployed position, with said second end of said arm being substantially in-line and centered upon the front of the toilet, and at a position where a top surface of said second end of said arm is less than 10 inches above the floor within the stall; and
   wherein said arm and said pivotal coupling of said arm to the stall door are configured to protrude a maximum distance away from the stall door, when in said stowed position, being less that a protruding length of a door stop mounted thereon, to permit opening of the stall door into a fully opened position.

13. The slacks valet device according to claim 1 further comprising slacks retaining means at said second end of said arm configured for preventing sliding of the lowered slacks off of said second end of said arm.

14. The slacks valet device according to claim 1,
wherein said means for connecting said first end of said arm to the stall door is further configured to support said arm, in said deployed position, with said second end of said arm being substantially in-line and centered upon the front of the toilet, and at a position where a top surface of said second end of said arm is less than 10 inches above the floor within the stall; and
wherein said means for connecting and said arm are configured to protrude a maximum distance away from the stall door, when in said stowed position, being less that a protruding length of a door stop mounted thereon, to permit opening of the stall door into a fully opened position.

15. The slacks valet device according to claim 3 wherein said stop means is configured for permitting additional traveling of said arm beyond said deployed position as a result of a force applied thereto.

16. The slacks valet device according to claim 3 further comprising means for securing said first and second arm sections in said stowed position.

17. A slacks support device, for preventing the slacks worn by a user of a toilet in a lavatory enclosure from becoming soiled, said device configured to provide support to prevent the lowered slacks from hanging down, to prevent contact with a floor within the enclosure, said slacks support device comprising: an arm having a first end and a second end; and means for connecting said arm to a lower portion of the lavatory enclosure for moving between a stowed position and a deployed position; said arm comprising a length, said length of said arm and said means for connecting configured for at least a portion of said arm to be in proximity to the front of the toilet and at a height above the floor being below a top surface of a seat of the toilet, in said deployed position; said stowed position comprising a position where said at least a portion of said arm has moved away from said proximity to the toilet, and into proximity to the lavatory enclosure; said arm comprising a width configured to fit between the legs of the user while standing, with said device in said deployed position, to thereat provide support for the slacks to prevent the lowered slacks from hanging down, to prevent contact with the floor.

18. The slacks support device according to claim 17 further comprising means for providing a plurality of successive hygienic contact surfaces on a top of said arm.

19. The slacks support device according to claim 17,
wherein said means for connecting said arm to the lavatory enclosure is further configured to support said arm, in said deployed position, with said second end of said arm being substantially in-line and centered upon the front of the toilet, and at a position where a top surface of said end of said arm is less than 10 inches above the floor within the enclosure; and
wherein said means for connecting and said arm are configured to protrude a maximum distance away from the stall door, when in said stowed position, being less that a protruding length of a door stop mounted thereon, to permit opening of the stall door into a fully opened position.

20. A slacks valet device, for preventing a pair of slacks worn a user of a toilet in a lavatory enclosure from becoming soiled, once lowered, said device configured to provide support proximate to a crotch of the lowered slacks to prevent the slacks from hanging down, to prevent contact with the a floor within the lavatory enclosure, said slacks valet device comprising:
a first arm section and a second arm section, and a joint configured to couple a first end of said second arm section to a second end of said first arm section;
means for connecting said first end of said first arm section to a portion of the lavatory enclosure for moving between a stowed position and a deployed position; said first arm section and said second arm section each comprising a respective length, said length of said first arm section, said length of said second arm section, said joint, and said means for connecting configured for at least a portion of said second arm section to extend into proximity to the front of the toilet, in said deployed position, with said portion of said second arm section positioned at a height being below a top surface of a seat of the toilet; said stowed position comprising a position where said at least a portion of said second arm section has moved away from said proximity to the toilet, and into proximity to the lavatory enclosure; said second arm section comprising a width configured to fit between the legs of the user while standing, with said device in said deployed position, to thereat provide support for the slacks to prevent the lowered slacks from hanging down to prevent contact with the floor; and
wherein said second arm section is at an angle with respect to said first arm section in said deployed position.

21. The slacks support device according to claim 20 further comprising means for providing a plurality of successive hygienic contact surfaces on a top of said second arm section.

* * * * *